United States Patent
Estes et al.

(10) Patent No.: US 11,124,750 B2
(45) Date of Patent: Sep. 21, 2021

(54) ULTRAVIOLET IRRADIATION OF FLUIDS

(71) Applicant: Sensor Electronic Technology, Inc., Columbia, SC (US)

(72) Inventors: Faris Mills Morrison Estes, West Columbia, SC (US); Alexander Dobrinsky, Silver Spring, MD (US)

(73) Assignee: Sensor Electronic Technology, Inc., Columbia, SC (US)

( * ) Notice: Subject to any disclaimer, the term of this patent is extended or adjusted under 35 U.S.C. 154(b) by 287 days.

(21) Appl. No.: 16/142,965

(22) Filed: Sep. 26, 2018

(65) Prior Publication Data
US 2019/0100718 A1   Apr. 4, 2019

Related U.S. Application Data

(60) Provisional application No. 62/566,423, filed on Sep. 30, 2017, provisional application No. 62/681,916, filed on Jun. 7, 2018.

(51) Int. Cl.
*C12H 1/16*   (2006.01)
*C12C 11/00*   (2006.01)
*C12C 7/20*   (2006.01)

(52) U.S. Cl.
CPC .............. *C12H 1/165* (2013.01); *C12C 7/20* (2013.01); *C12C 11/006* (2013.01)

(58) Field of Classification Search
CPC ...... A21L 2/10; A21L 2/24; C02F 1/32; C02F 1/325; C12H 1/165; C12C 7/20; C12C 11/006; A61L 2/10; A61L 2/24; G01N 21/01; G01N 21/51
See application file for complete search history.

(56) References Cited

U.S. PATENT DOCUMENTS

| | | | |
|---|---|---|---|
| 6,589,172 B2 * | 7/2003 | Williams | A61B 5/14542 600/309 |
| 7,553,456 B2 | 6/2009 | Gaska et al. | |
| 7,634,996 B2 | 12/2009 | Gaska et al. | |
| 8,277,734 B2 | 10/2012 | Koudymov et al. | |
| 8,980,178 B2 | 3/2015 | Gaska et al. | |
| 9,006,680 B2 | 4/2015 | Bettles et al. | |

(Continued)

OTHER PUBLICATIONS

Long, Jared, "An Overview of the Brewing Process," Altitude Chophouse and Brewery, 23 pages.

*Primary Examiner* — Brian W Jennison
(74) *Attorney, Agent, or Firm* — LaBatt, LLC

(57) ABSTRACT

Ultraviolet irradiation of fluids for the purposes of disinfection, sterilization and modification of a target organic compound found within the fluids. The target compound in the fluids can have an absorption spectra with an ultraviolet wavelength ranging from 230 nm to 360 nm. The absorption spectra includes a first and second set of wavelengths corresponding to absorption peaks and absorption valleys in the absorption spectra, respectively. A-set of ultraviolet radiation sources irradiate the fluids. The set of ultraviolet radiation sources operate at a set of peak wavelengths ranging from 230 nm to 360 nm with a peak full width at half maximum that is less than 20 nm. The set of peak wavelengths are proximate to at least one wavelength in the second set of wavelengths corresponding to the absorption valleys in the absorption spectra with a variation of a full width half maximum of the absorption valley.

20 Claims, 9 Drawing Sheets

(56) References Cited

U.S. PATENT DOCUMENTS

| | | |
|---|---|---|
| 9,034,271 B2 | 5/2015 | Shur et al. |
| 9,061,082 B2 | 6/2015 | Gaska et al. |
| 9,138,499 B2 | 9/2015 | Bettles et al. |
| 9,179,703 B2 | 11/2015 | Shur et al. |
| 9,572,903 B2 | 2/2017 | Dobrinsky et al. |
| 9,603,960 B2 | 3/2017 | Dobrinsky et al. |
| 9,687,577 B2 | 6/2017 | Dobrinsky et al. |
| 9,707,307 B2 | 7/2017 | Shur et al. |
| 9,718,706 B2 | 8/2017 | Smetona et al. |
| 9,724,441 B2 | 8/2017 | Shur et al. |
| 9,750,830 B2 | 9/2017 | Shur et al. |
| 9,757,486 B2 | 9/2017 | Dobrinsky et al. |
| 9,795,699 B2 | 10/2017 | Shur et al. |
| 9,801,965 B2 | 10/2017 | Bettles et al. |
| 9,802,840 B2 | 10/2017 | Shturm et al. |
| 9,878,061 B2 | 1/2018 | Shur et al. |
| 9,919,068 B2 | 3/2018 | Shur et al. |
| 9,974,877 B2 | 5/2018 | Bettles et al. |
| 9,981,051 B2 | 5/2018 | Shur et al. |
| 9,987,383 B2 | 6/2018 | Bilenko et al. |
| 9,999,782 B2 | 6/2018 | Shur et al. |
| 10,099,944 B2 | 10/2018 | Smetona et al. |
| 2006/0177555 A1* | 8/2006 | Doi .................. C02F 1/325 426/523 |
| 2008/0095661 A1* | 4/2008 | Kohler .............. A61L 9/20 422/20 |
| 2013/0048545 A1* | 2/2013 | Shatalov .......... C02F 1/325 210/96.1 |
| 2014/0074010 A1 | 3/2014 | Veres et al. |
| 2014/0202962 A1* | 7/2014 | Bilenko ............ C02F 1/325 210/748.11 |
| 2015/0008167 A1* | 1/2015 | Shturm ............. C02F 1/325 210/85 |
| 2015/0032191 A1 | 1/2015 | Varghese et al. |
| 2015/0069265 A1* | 3/2015 | Smetona ........... A61L 2/10 250/455.11 |
| 2015/0297767 A1 | 10/2015 | Gaska et al. |
| 2015/0336810 A1 | 11/2015 | Smetona et al. |
| 2016/0114186 A1 | 4/2016 | Dobrinsky et al. |
| 2017/0057842 A1 | 3/2017 | Dobrinsky et al. |
| 2017/0100494 A1* | 4/2017 | Dobrinsky ....... A61L 2/0047 |
| 2017/0100495 A1 | 4/2017 | Shur et al. |
| 2017/0189711 A1 | 7/2017 | Shur et al. |
| 2017/0245527 A1 | 8/2017 | Dobrinsky et al. |
| 2017/0245616 A1 | 8/2017 | Lakios et al. |
| 2017/0281812 A1 | 10/2017 | Dobrinsky et al. |
| 2017/0290934 A1 | 10/2017 | Dobrinsky et al. |
| 2017/0368215 A1 | 12/2017 | Shatalov et al. |
| 2018/0028700 A1 | 2/2018 | Dobrinsky et al. |
| 2018/0092308 A1 | 4/2018 | Barber et al. |
| 2018/0104368 A1 | 4/2018 | Dobrinsky et al. |
| 2018/0117194 A1 | 5/2018 | Dobrinsky et al. |
| 2018/0185529 A1 | 7/2018 | Shur et al. |
| 2018/0221521 A1 | 8/2018 | Shur et al. |
| 2018/0243458 A1 | 8/2018 | Shatalov et al. |
| 2018/0339075 A1 | 11/2018 | Kennedy et al. |
| 2019/0030477 A1 | 1/2019 | Shatalov |

\* cited by examiner

FIG. 7 Feedback Loop

ULTRAVIOLET IRRADIATION OF FLUIDS

REFERENCE TO RELATED APPLICATIONS

The present patent application claims the benefit of U.S. Provisional Application No. 62/566,423, which was filed on 30 Sep. 2017, and U.S. Provisional Application No. 62/681,916, which was filed on 7 Jun. 2018, both which are hereby incorporated by reference.

TECHNICAL FIELD

The disclosure relates generally to ultraviolet treatment of fluids, and more specifically, to a solution for using ultraviolet radiation for disinfecting, sterilizing, and/or sanitizing fluids, containers carrying and holding the fluids, and/or modification of organic compounds found within the fluids.

BACKGROUND ART

Ultraviolet light irradiation has gained rapid acceptance within the food and beverage industry as a non-thermal disinfectant and sterilization technique. In general, ultraviolet light kills all known pathogens and spoilage microorganisms, including bacteria, viruses, yeasts and molds (and their spores). It is a low maintenance, environmentally friendly technology, which eliminates the need for chemical treatment while ensuring high levels of disinfection.

The beer brewing industry is one area where usage of ultraviolet light irradiation is harder to implement. Beer is a complex fermented beverage that has quite a number of chemical reactions in the beer brewing process. It has been well established that visible and ultraviolet light have detrimental effects on beer. For example, beer that is exposed to light with wavelengths ranging from about 280 nm to about 500 nm can develop a "skunky" flavor, which is sometimes also referred to as a "sunstruck" or a "light struck" flavor. It is widely believed that the skunky flavor arises from a photochemical reaction sequence that is initiated by the absorption of light by one or more of several photosensitizers that are typically present in beer such as flavins, and in particular, riboflavins. These photosensitizers become excited in response to exposure to ultraviolet light and visible light, and in their excited state, react with the bittering principles (e.g., hop bitter acids) in the beer such as isohumulones, and form 3-methyl butene thiol (3-MBT), leading to the skunky flavor. Only very small amounts of these sulfur-containing compounds are necessary to be present to impart the skunky flavor to the beer and render it unacceptable. As a consequence of the instability of the riboflavins, which leads to the production of thiols when subjected to ultraviolet light, the beer brewing industry has generally been reluctant to use ultraviolet light irradiation despite its disinfection benefits.

SUMMARY OF THE INVENTION

This Summary Of The Invention introduces a selection of certain concepts in a brief form that are further described below in the Detailed Description Of The Invention. It is not intended to exclusively identify key features or essential features of the claimed subject matter set forth in the Claims, nor is it intended as an aid in determining the scope of the claimed subject matter.

Aspects of the present invention are directed to solutions that overcome the perceived drawbacks associated with using ultraviolet light irradiation in certain fluid (e.g., beverage) industries such as the beer brewing field which has typically shunned the use of ultraviolet irradiation due to the effect that it can have on the taste of the beverage. Although the various embodiments are directed to beer including beer producing fluids such as wort, these embodiments are suited for use for with a variety of other fluids associated with beverages that may have a need for removal of bacteria, viruses, and germs in its production, but are generally not irradiated with ultraviolet radiation because the fluids contain certain organic compounds that undergo chemical reactions in the presence of ultraviolet light that can alter the taste, smell, and/or appearance of the fluids in an unacceptable manner.

In the various embodiments, a set of ultraviolet radiation sources can be used to irradiate a fluid in a conduit transporting the fluid or a container storing the fluid. The fluid can include at least one target compound that can react adversely to ultraviolet radiation. The target compound(s) can be characterized with an absorption spectra having an ultraviolet wavelength ranging from 230 nm to 360 nm. The absorption spectra can include a first set of wavelengths corresponding to absorption peaks in the absorption spectra and a second set of wavelengths corresponding to absorption valleys in the absorption spectra. The set of ultraviolet radiation sources can be configured to operate at a set of peak wavelengths ranging from 230 nm to 360 nm with a peak full width at half maximum that is less than 20 nm. In one embodiment, each of the set of peak wavelengths for the ultraviolet radiation sources are proximate in value to at least one wavelength in the second set of wavelengths corresponding to the absorption valleys in the absorption spectra with an allowed variation of a full width half maximum of the valley.

In one embodiment, the set of peak wavelengths generated from the set of ultraviolet radiation sources can each have a width (e.g., a full width half maximum that is less than 20 nm) that precludes wavelength regions in proximity to the first set of wavelengths corresponding to the absorption peaks in the absorption spectra. To this extent, the set of peak wavelengths generated from the set of ultraviolet radiation sources can coincide within a full width at half maximum value of a wavelength associated with one of the absorption valleys in the absorption spectra. In one embodiment, each of the set of peak wavelengths can correlate with at least one wavelength in the second set of wavelengths corresponding to the absorption valleys in the absorption spectra, in that absorption at any wavelength in the second set of wavelengths is at least less than half the difference between an absorption value of a neighboring highest absorption peak and an absorption value at its corresponding absorption valley.

By irradiating the fluid with ultraviolet radiation that corresponds with the absorption valleys of the absorption spectra for the target compound(s), the fluid can be irradiated at a wavelength that is sufficient for disinfection and/or sterilization of the fluid, but also at a wavelength that does not lead to the target compound(s) undergoing a chemical reaction that can ultimately alter the taste, smell and/or appearance of the fluid. Furthermore, LEDs can deliver a much more focused light source and wavelength compared to other light sources. Because of this aspect, the light source can deliver a large amount of light to a targeted area at a very specific wavelength to provide the desired effect of sterilizing the fluid without exposing the entire batch at one time or causing off-flavors due to undesired effects caused by wide ranging wavelengths in the UV spectrum.

The set of ultraviolet radiation sources, which can include more than one set of sources, can be implemented in an ultraviolet light emitting diode (UV LED) based system that is integrated in an ultraviolet treatment chamber, housing, enclosure, and the like, to treat the fluid with ultraviolet radiation. In addition to having the set of ultraviolet radiation sources operating in the aforementioned manner, the ultraviolet treatment chamber can include at least one sensor to detect a process parameter associated with the fluid and a control unit operatively coupled to the set of ultraviolet radiation sources and the at least one sensor. To this extent, the control unit can be configured to adjust at least one of a plurality of irradiation parameters associated with the radiation generated from the set of ultraviolet radiation sources as a function of the process parameter(s) detected by the at least one sensor. The plurality of irradiation parameters can comprise the wavelength of the ultraviolet radiation emitted by the set of ultraviolet radiation sources, an intensity or overall dosage of the ultraviolet radiation delivered to a volume of the fluid in the ultraviolet treatment chamber by the set of ultraviolet radiation sources, and a treatment time that the ultraviolet radiation sources deliver the ultraviolet radiation to the fluid. Other irradiation parameters can include, but are not limited to, a power setting for operating the ultraviolet radiation sources, and a maximum operating temperature of the ultraviolet radiation sources.

The types of sensors that can be used with the ultraviolet treatment chamber can include any combination of one or more of a number of different sensors. In one embodiment, a fluid transparency sensor can be configured to detect the transparency of the fluid. In this manner, the control unit can adjust at least one of the plurality of irradiation parameters generated by the set of ultraviolet radiation sources as a function of the transparency of the fluid. Examples of a fluid transparency sensor can include, but are not limited to, housing through which at least some of the fluid flows with light source emitting light through the fluid and directed toward a light sensor. In one embodiment, a fluorescence sensor can be configured to detect the fluorescence emissivity of the fluid after irradiation by the set of ultraviolet radiation sources. In this manner, the control unit can adjust at least one of the plurality of irradiation parameters generated by the set of ultraviolet radiation sources as a function of the wavelength and the intensity of the fluorescence of the fluid. The control unit can also determine a chemical and bacterial composition of the fluid based on the detected fluorescence emissivity. Examples of a fluorescence sensor can include, but are not limited to, a fluorometer.

In one embodiment, a chemical sensor can be configured to detect chemical components of the fluid. This allows the control unit to determine the chemical composition of the fluid from the detected chemical components and adjust at least one of the plurality of irradiation parameters as a function of the chemical composition of the fluid. In addition, the control unit can be configured to determine an amount of a target compound in the fluid based on the chemical composition of the fluid. A non-exhaustive listing of examples of target compounds in a fluid that the control unit can determine and evaluate for its presence in the fluid can include determining an amount of ethanol within a fluid and an amount of sugars in a fluid. It is understood that there can be a number of different compounds of which will depend on the fluid. Any suitable chemical sensor can be used based on the compound(s) being targeted. Any number of all of the noted sensors whether singly or in combination with one another can be implemented for use in an ultraviolet treatment chamber.

The control unit can include a number of different components that enable it to control the set of ultraviolet radiation sources and make any determinations relating to the fluid and any target compounds present in the fluid. For example, other components that may be utilized with the control unit can include a timer, an input component, an output component and a power supply. The timer can be set in accordance with the specified treatment time in order to ensure that the ultraviolet radiation sources deliver a sufficient dosage to the fluid. The input component can permit a user to adjust at least one of the plurality of process and irradiation parameters, and the output component can indicate status information of the treatment (e.g., on, off, treated, needs treatment, etc.), as well as generate information of more specific details of the treatment. The power supply can provide power to all of these components. These components are not limited to use with only the control unit, but can also be implemented as parts of an ultraviolet treatment chamber and used to operate in conjunction with the control unit and the sensor(s).

In one embodiment, the ultraviolet treatment chamber with the set of ultraviolet radiation sources, the sensor(s) and the control unit can be used in a beer brewing process to irradiate beer and beer producing fluids such as wort in order to disinfect and/or sterilize the beer, and irradiate target compounds within the beer to prevent the production of thiols that can cause the skunky flavor beer due to exposure to ultraviolet light. In one embodiment, the ultraviolet treatment chamber can include a first ultraviolet treatment chamber and a second ultraviolet treatment chamber. For example, the first ultraviolet treatment chamber can be located upstream of a fermentation stage of the beer brewing process and the second ultraviolet treatment chamber can be implemented as part of a fermentation maturation stage to neutralize bacteria, inactivate yeast that is added to the brewing process during the fermentation stage and control alcohol content of the beer that is formed. Both the first ultraviolet treatment chamber and the second ultraviolet treatment chamber can each include a set of ultraviolet radiation sources configured to irradiate the beer producing liquid with ultraviolet radiation having the characteristics noted above with regard to the absorption spectra of the fluid. In this embodiment, an ultraviolet transparent conduit can transport the fluid about the multiple fluid processing stages of the beer brewing process including to and from the fermentation stage.

This beer brewing process embodiment can be configured with other components that complement the ultraviolet irradiation provided by the first and second ultraviolet treatment chambers to further enhance the disinfection, sterilization, and/or implementation of any desired modification of targeted compounds within the beer producing fluid. For example, the second ultraviolet treatment chamber can have a photocatalyst configured to affect a chemical reaction within the beer producing fluid in response to irradiation by the set of ultraviolet radiation sources in this treatment chamber. The second ultraviolet treatment chamber can also include a set of visible light sources configured to irradiate the fluid with visible light radiation. The second ultraviolet treatment chamber can further include a mixing component configured to mix the fluid during irradiation by the set of ultraviolet radiation sources in this chamber. In one embodiment, another set of ultraviolet radiation sources, apart from those used with the first and second ultraviolet treatment chambers, can be used to irradiate the ultraviolet transparent conduit while devoid of any of the beer producing fluid. To this extent, this set of ultraviolet radiation sources can be configured to operate at a disinfection wavelength and intensity designed to disinfect the ultraviolet transparent conduit. In one embodiment, a filtering system can be used to filter undesired contaminants from beer producing fluid before entering either one or both of the ultraviolet treatment chambers.

A first aspect of the invention provides a system, comprising: a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; and a set of ultraviolet radiation sources to irradiate the fluid, the set of ultraviolet radiation sources configured to operate at a set of peak wavelengths ranging from 230 nm to 360 nm with a peak full width at half maximum that is less than 20 nm, wherein each of the set of peak wavelengths is proximate in value to at least one wavelength in the second set of wavelengths corresponding to the absorption valleys in the absorption spectra with an allowed variation of a full width half maximum of the absorption valley.

A second aspect of the invention provides a system, comprising: a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; and an ultraviolet treatment chamber to treat the fluid with ultraviolet radiation, the ultraviolet treatment chamber including a set of ultraviolet radiation sources to irradiate the fluid, the set of ultraviolet radiation sources configured to operate at a set of peak wavelengths ranging from 230 nm to 360 nm with a peak full width at half maximum that is less than 20 nm, wherein the set of peak wavelengths are proximate in value to at least one wavelength in the second set of wavelengths corresponding to the absorption valleys in the absorption spectra with an allowed variation of a full width half maximum of the absorption valley, at least one sensor to detect a process condition associated with the fluid; and a control unit operatively coupled to the set of ultraviolet radiation sources and the at least one sensor, wherein the control unit is configured to adjust at least one of a plurality of irradiation parameters associated with the radiation generated from the set of ultraviolet radiation sources as a function of the process condition detected by the at least one sensor, the plurality of irradiation parameters comprising the wavelength of the ultraviolet radiation emitted by the set of ultraviolet radiation sources, an intensity or overall dosage of the ultraviolet radiation delivered to a volume of the fluid in the ultraviolet treatment chamber by the set of ultraviolet radiation sources, and a treatment time that the ultraviolet radiation sources deliver the ultraviolet radiation to the fluid.

A third aspect of the invention provides a system, comprising: a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; an ultraviolet transparent conduit to transport the fluid about a beverage manufacturing process having multiple fluid processing stages for formation of the beverage; and at least one ultraviolet treatment chamber located about a fluid processing stage within the beverage manufacturing process to treat the fluid, the at least one ultraviolet treatment chamber including a set of ultraviolet radiation sources configured to irradiate the fluid, the set of ultraviolet radiation sources operating at a set of peak wavelengths ranging from 230 nm to 360 nm with a peak full width at half maximum that is less than 20 nm, wherein the set of peak wavelengths are proximate in value to at least one wavelength in the second set of wavelengths corresponding to the absorption valleys in the absorption spectra with an allowed variation of a full width half maximum of the absorption valley, at least one sensor to detect a process condition associated with the fluid, and a control unit operatively coupled to the set of ultraviolet radiation sources and the at least one sensor, wherein the control unit is configured to adjust at least one of a plurality of irradiation parameters associated with the radiation generated from the set of ultraviolet radiation sources as a function of the process condition detected by the at least one sensor.

A fourth aspect of the invention provides a system, comprising: a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; a first set of ultraviolet radiation sources to irradiate the fluid, the first set of ultraviolet radiation sources including UV-A radiation sources configured to irradiate the fluid with UV-A radiation in a range of 380 nm to 460 nm; a second set of ultraviolet radiation sources to irradiate the fluid, the second set of ultraviolet radiation sources configured to operate at a set of peak wavelengths ranging from 230 nm to 360 nm with a peak full width at half maximum that is less than 20 nm, wherein each of the set of peak wavelengths are proximate in value to at least one wavelength in the second set of wavelengths corresponding to the absorption valleys in the absorption spectra with an allowed variation of a full width half maximum of the absorption valley; at least one sensor to detect a process parameter associated with the fluid during the irradiation of the fluid by the first set of ultraviolet radiation sources and the second set of ultraviolet radiation sources; and a control unit operatively coupled to the first set of ultraviolet radiation sources, the second set of ultraviolet radiation sources, and the at least one sensor, wherein the control unit is configured to control the irradiation of the fluid by the first set of ultraviolet radiation sources and the second set of ultraviolet radiation sources in response to the process parameter detected by the at least one sensor, wherein the control unit is configured to direct the first set of ultraviolet radiation sources to irradiate the fluid with the UV-A radiation for a prolonged time period that ranges from tens of minutes to tens of hours and the second set of ultraviolet radiation sources to irradiate the fluid with the ultraviolet radiation at short burst of intensity lasting at most a few minutes.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 6A shows a schematic of an illustrative beer brewing process according to the prior art, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
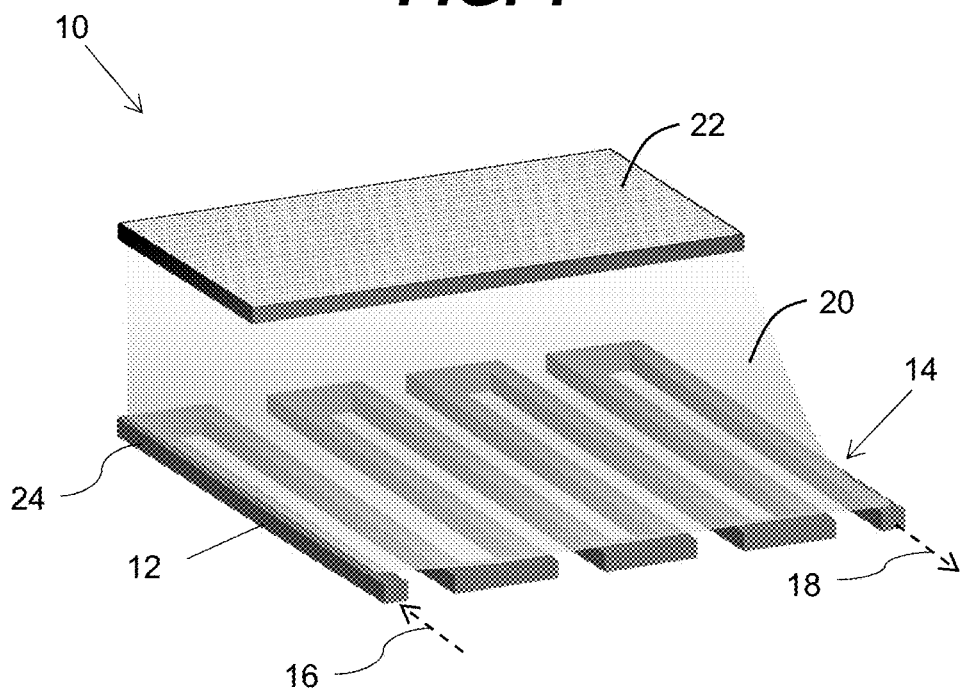
FIG. 1 shows a schematic of a system for irradiating a fluid with ultraviolet radiation according to an embodiment.

As indicated above, aspects of the invention are directed to systems for irradiating fluids with ultraviolet radiation for purposes of disinfection, sterilization, and/or sanitization of the fluids, conduits that carry the fluids and/or containers that contain the fluids, while ensuring that the ultraviolet radiation does not affect the taste, appearance and smell of the fluids. Although the various embodiments are described with respect to beer including beer producing fluids such as wort, it is understood that the teachings of these embodiments are suited for use with any volume of beverage fluids that may have a need for removal of bacteria, viruses, and germs during its production, but are generally not irradiated with ultraviolet radiation due to the fluids containing certain organic compounds that undergo a chemical reaction in the presence of ultraviolet light that can alter the taste, smell, and/or appearance of the fluids in an unacceptable manner. Examples of other beverage fluids which the various embodiments are suitable for use with include, but are not limited to, milk, juices, sodas, wine, malt beverages, and distilled liquors.

As used herein, ultraviolet irradiation of a fluid and/or the conduits and containers containing the fluid can entail sanitizing, disinfecting, and/or sterilizing. Sanitizing generally means reducing the number of bacterial contaminants to a predetermined safe level. Disinfecting generally means destroying pathogenic and other types of microorganisms, while sterilizing can be more extensive in that it kills all microbial forms and/or include destroying the ability of the microbial forms to reproduce.

Ultraviolet radiation, which can be used interchangeably with ultraviolet light, means electromagnetic radiation having a wavelength ranging from approximately 10 nm to approximately 400 nm. Within this range, there is ultraviolet-A (UV-A) electromagnetic radiation having a wavelength ranging from approximately 315 nm to approximately 400 nm, ultraviolet-B (UV-B) electromagnetic radiation having a wavelength ranging from approximately 280 nm to approximately 315 nm, and ultraviolet-C (UV-C) electromagnetic radiation having a wavelength ranging from approximately 100 nm to approximately 280 nm.

Generally, ultraviolet radiation, and in particular, UV-B radiation and UV-C radiation is "germicidal," i.e., it deactivates the DNA of bacteria, viruses and other pathogens, and thus, destroys their ability to multiply and cause disease. This effectively results in sterilization of the microorganisms. Specifically, UV-B radiation and UV-C radiation cause damage to the nucleic acid of microorganisms by forming covalent bonds between certain adjacent bases in the DNA. The formation of these bonds prevents the DNA from being "unzipped" for replication, and the organism is neither able to produce molecules essential for life process, nor is it able to reproduce. In fact, when an organism is unable to produce these essential molecules or is unable to replicate, it dies. Ultraviolet radiation with a wavelength of approximately between about 250 nm to about 290 nm provides the highest germicidal effectiveness, while an ultraviolet radiation between about 260 nm to about 310 nm is sufficient for providing overall germicidal effectiveness, and ultraviolet radiation between 260 nm to 270 nm is a preferred range for facilitating disinfection, sterilization of the beverage fluids. While susceptibility to ultraviolet radiation varies, exposure to ultraviolet energy in the above range for about 20 to about 34 milliwatt-seconds/cm$^2$ is adequate to deactivate approximately 99 percent of the pathogens.

As used herein, a material/structure is considered to be "reflective" to ultraviolet light of a particular wavelength when the material/structure has an ultraviolet reflection coefficient of at least 30 percent for the ultraviolet light of the particular wavelength. A highly ultraviolet reflective material/structure has an ultraviolet reflection coefficient of at least 80 percent. Furthermore, a material/structure/layer is considered to be "transparent" to ultraviolet radiation of a particular wavelength when the material/structure/layer allows at least ten percent of radiation having a target wavelength, which is radiated at a normal incidence to an interface of the material/structure/layer to pass there through. Also, unless otherwise noted, the term "set" means one or more (i.e., at least one) and the phrase "any solution" means any now known or later developed solution.

The fluid irradiation systems described herein can include a number of components described below in more detail, some of which may be optional, that facilitate the treatment of fluids and the conduits and containers in which the fluids can be transported or stored. The modalities used with the various ultraviolet treatment systems for irradiating fluids described herein including its respective components can include any now known or later developed approaches that incorporate the concepts of the embodiments described below in more detail.

The description that follows may use other terminology herein for the purpose of only describing particular embodiments and is not intended to be limiting of the disclosure. For example, unless otherwise noted, the term "set" means one or more (i.e., at least one) and the phrase "any solution" means any now known or later developed solution. The singular forms "a," "an," and "the" include the plural forms as well, unless the context clearly indicates otherwise. It is further understood that the terms "comprises," "comprising," "includes," "including," "has," "have," and "having" when used in this specification, specify the presence of stated features, integers, steps, operations, elements, and/or components, but do not preclude the presence or addition of one or more other features, integers, steps, operations, elements, components, and/or groups thereof.

Turning to the drawings, FIG. 1 shows a schematic of system 10 for irradiating a fluid 12 carried by a conduit 14 having an inlet 16 and an outlet 18 with ultraviolet radiation 20 generated from an ultraviolet radiation source 22 according to an embodiment. In one embodiment, the conduit 14 comprises an ultraviolet transparent conduit (e.g., a channel, a tube, a pipe, a pathway, a cylinder, or the like) that allows the fluid 12 to flow from the inlet 16 to the outlet 18 and be irradiated by the ultraviolet radiation source 22. As shown in FIG. 1, the ultraviolet transparent conduit can include an ultraviolet transparent channel having a serpentine shape formed from welded separators 24 of a predetermined height that allows passage of the ultraviolet radiation 20 while the fluid 12 is transported through the channel, as well as sufficient irradiation of the fluid during its residency within the conduit.

It is understood that the predetermined height of the welded separators 24 can be selected to be within a range of heights that allow thorough radiation of the fluid 12 during its motion through the channel for typical transparency values of the fluid. The serpentine shape of the welded separators 24 provides a laminar flow of the fluid 12 with enhanced heat transfer of the ultraviolet radiation 20 as opposed to a straight ultraviolet transparent channel. Nevertheless, it is understood that the serpentine shape of the ultraviolet transparent channel depicted in FIG. 1 is only illustrative of one possible implementation of a fluid conduit that can be used with an ultraviolet radiation source to irradiate a fluid in the manner described herein that effectuates disinfection, sterilization, and/or sanitization of the fluid without affecting the taste, appearance, and/or smell of the fluid. Those skilled in the art will appreciate that the fluid conduit can comprise any one of a number of different types of conduits with different shapes having one or more inlets and one or more outlets.

The ultraviolet transparent conduit can include any of a number of different ultraviolet transparent materials that are chemically inert to any interaction with the fluid 12 and chemically stable to exposure to the ultraviolet radiation 20 generated from the ultraviolet radiation source 22. Ultraviolet transparent polymers that include, but are not limited to, fluorinated ethylene propylene (FEP), tetrafluoroethylene hexafluoropropylene vinylidene fluoride (THV), polytetrafluoroethylene (PTFE), and/or the like, are examples of ultraviolet transparent material that are suitable for use with the ultraviolet transparent conduit.

In one embodiment, the ultraviolet radiation source 22 can include a set of ultraviolet radiation sources each configured to emit ultraviolet radiation towards the conduit 14 to effectuate an ultraviolet treatment of the fluid 12 therein. In the example illustrated in FIG. 1, the ultraviolet radiation sources 22 can be positioned above the conduit 14. It is understood that the ultraviolet radiation sources 22 can be positioned in other locations about the conduit 14. For example, the ultraviolet radiation sources 22 can be positioned above, below, and/or to the sides of the conduit 14. Further, it is understood that the number of ultraviolet radiation sources 22 that can be utilized can vary as desired.

The set of ultraviolet radiation sources can comprise any combination of one or more ultraviolet radiation emitters. For example, the set of ultraviolet radiation sources can include a high intensity ultraviolet lamp (e.g., a high intensity mercury lamp), a discharge lamp, ultraviolet light emitting diodes (LEDs), super luminescent LEDs, laser diodes, and/or the like. In an embodiment, the set of ultraviolet radiation sources includes a set of light emitting diodes manufactured with one or more layers of materials selected from the group-III nitride material system (e.g., $Al_xIn_yGa_{1-x-y}N$, where $0 \leq x$, $y \leq 1$, and $x+y \leq 1$ and/or alloys thereof). Additionally, the set of ultraviolet radiation sources 22 can comprise one or more additional components (e.g., a wave guiding structure, a component for relocating and/or redirecting ultraviolet radiation emitter(s), etc.) to direct and/or deliver the emitted radiation to a particular location/area, in a particular direction, in a particular pattern, and/or the like. Illustrative wave guiding structures include, but are not limited to, a wave guide, a plurality of ultraviolet fibers, each of which terminates at an opening, a diffuser, and/or the like. In addition, optical elements including but not limited to, lenses, prismatic ultraviolet transparent elements, mirror elements (e.g., a parabolic mirror element, an omnidirectional mirror, a planar mirror and/or the like) can be deployed for focusing the radiation in a particular pattern and/or direction.

In order to recycle or recirculate the ultraviolet radiation emitted from the ultraviolet radiation source 22, the fluid 12, the conduit 14, and the ultraviolet radiation source 22 can be situated in a housing or chamber having all or at least a portion of its inner wall surfaces with an ultraviolet reflective layer and an exterior formed from an ultraviolet impenetrable material (e.g., ultraviolet absorbing material). In general, an ultraviolet reflective layer with a reflection coefficient of at least 50% will enable recycling of the ultraviolet radiation generation from the ultraviolet radiation sources 22. In one embodiment, the ultraviolet reflective layer can include a diffusive ultraviolet reflective layer. The diffusive ultraviolet reflective layer can include a coating or thin film of a fluoropolymer. Examples of a fluoropolymer that are suitable as a diffusive ultraviolet reflective material that enables diffusive reflectivity can include, but are not limited to, expanding polytetrafluoroethylene (ePTFE) membrane (e.g., GORE® DRP® Diffuse Reflector Material), polytetrafluoroethylene (PTFE), and/or the like. Other examples of ultraviolet material that can be used to recycle radiation can include, but are not limited to, polished aluminum, Bragg reflective dielectric mirrors, omni-directional mirrors comprising dielectric and metallic layers (e.g., aluminum), and/or the like.

In another embodiment, the conduit 14 can be configured to have an ultraviolet reflective layer to recycle or recirculate the ultraviolet radiation 20 from the ultraviolet radiation sources 22. For example, a bottom portion of the conduit 14 can comprise a reflective cavity. In one embodiment, one or more ultraviolet reflective domains may be placed within the conduit 14 in the stream path to facilitate recycling of the radiation. As used herein, an ultraviolet reflective domain is any object that has a surface reflectivity of at least 40% to the target ultraviolet radiation directed normal to the surface. It is understood that the ultraviolet reflective domains can be selected to be biologically and chemically inactive when placed within the fluid. Examples of ultraviolet reflective domains can include, but are not limited to, fluoropolymers, $SiO_2$, anodized aluminum oxide (AAO), and/or the like.

It is understood that the conduit 14 and its inner wall surfaces can be implemented with one or more of the above-noted modalities that can recycle or recirculate ultraviolet radiation generated from the ultraviolet radiation sources 22. For example, the inner wall surfaces of the conduit 14 can have portions with both ultraviolet reflective material and diffusive ultraviolet reflective material. Those skilled in the art will appreciate that there are a multiple of different combinations that can be used with the inner wall surfaces of the conduit 14 to recycle or recirculate ultraviolet radiation. These inner wall surfaces, in combination with ultraviolet transparent outer wall surfaces that can include, but are not limited to, fluoropolymers, $Al_2O_3$, sapphire, $SiO_2$, $CaF_2$, $MgF_2$, and/or the like, can be configured to reflect, recycle, recirculate and light guide ultraviolet radiation in a number of different arrangements.

The system 10 of FIG. 1 can be implemented with other components that facilitate the irradiation of the fluid 12 and the conduit 14 carrying the fluid. For example, the conduit 14 can be configured with photocatalysts designed to improve the treatment of the fluid 12 by enhancing the disinfection and sterilization of the fluid upon irradiation by the ultraviolet light. In one embodiment, a photocatalyst such as for example, $TiO_2$, can be applied to the inner surfaces of the conduit 14. In another embodiment, the photocatalysts can be designed to affect a chemical reaction in the fluid. For example, $TiO_2$ can be used to cause photocatalytic oxidation.

In one embodiment, the conduit 14 can be configured with photocatalysts designed to improve the treatment of the fluid 12 by interacting with and disrupting the proliferation of microorganisms in the fluid through the formation of hydroxyl group radicals and reactive oxygen species (ROS). In particular, the photocatalysts can generate the hydroxyl group radicals and ROS in response to irradiation with ultraviolet radiation at predetermined wavelengths while in the presence of water vapor. The hydroxyl group radicals and the ROS can disrupt the proliferation of microorganisms in the fluid 12 by binding to and oxidizing the microorganisms. In one embodiment, photocatalysts with metal oxides can be used to form hydroxyl group radicals and ROS that can disrupt the growth and proliferation of microorganisms in the fluid 12. Examples of photocatalysts with metal oxides that can be used to form hydroxyl group radicals and ROS include, but are not limited to, $TiO_2$, copper, silver and copper/silver particles.

In one embodiment, the aforementioned photocatalysts can be used to form hydroxyl group radicals and ROS in the fluid 12 in response to being irradiated with ultraviolet radiation at a predetermined wavelength that ranges from 360 nm to 380 nm. In another embodiment, more than one of the aforementioned photocatalysts can be used to form hydroxyl group radicals and ROS in the fluid 12. Each of these photocatalysts can form the hydroxyl group radicals and ROS in the fluid in response to being irradiated with ultraviolet radiation at a predetermined wavelength that corresponds to a wavelength range known for that particular photocatalyst that can generate hydroxyl group radicals and ROS. It is understood that wavelengths used with each of the photocatalysts can be adjusted to optimize formation of the hydroxyl group radicals and ROS using any solution.

The ultraviolet radiation sources 22 can be configured to operate at a number of wavelengths in order to irradiate the fluid 12 in the conduit 14 in a manner that facilitates disinfection, sterilization, and the like, while not altering any target compounds within the fluids (e.g., organic compounds) that are photosensitizers that can alter the taste, appearance and/or smell of the fluid upon exposure to ultraviolet light. The various embodiments described herein can address the dilemma that has existed for certain beverage manufacturers who have desired to utilize ultraviolet irradiation for treatment (i.e., disinfection, sterilization, sanitation) of fluids, conduits carrying the fluids, and containers storing the fluids, but have avoided implementation of any ultraviolet irradiation modalities due to the effect that light radiation can have on a beverage. In particular, the various embodiments propose operating the ultraviolet radiation sources 22 at a set of peak wavelengths that can be optimized for irradiating the fluids without leading to any unwelcome alterations.

In one embodiment, the target compound of the fluid 12 can include an absorption spectra having an ultraviolet wavelength ranging from 230 nm to 360 nm. The absorption spectra can include a first set of wavelengths corresponding to absorption peaks in the absorption spectra and a second set of wavelengths corresponding to absorption valleys in the absorption spectra. The set of ultraviolet 22 radiation sources can be configured to operate at a set of peak wavelengths ranging from 230 nm to 360 nm with a peak full width at half maximum (FWHM) that is less than 20 nm. In one embodiment, each of the set of peak wavelengths for the ultraviolet radiation sources 22 are proximate in value to at least one wavelength in the second set of wavelengths corresponding to the absorption valleys in the absorption spectra with an allowed variation of a full width half maximum of the absorption valley. In one embodiment, the set of peak wavelengths generated from the set of ultraviolet radiation sources can each have a width (e.g., a full width half maximum that is less than 20 nm) that precludes wavelength regions in proximity to the first set of wavelengths corresponding to the absorption peaks in the absorption spectra. To this extent, the set of peak wavelengths generated from the set of ultraviolet radiation sources can coincide within a full width at half maximum value of a wavelength associated with one of the absorption valleys in the absorption spectra.

Figure 2:
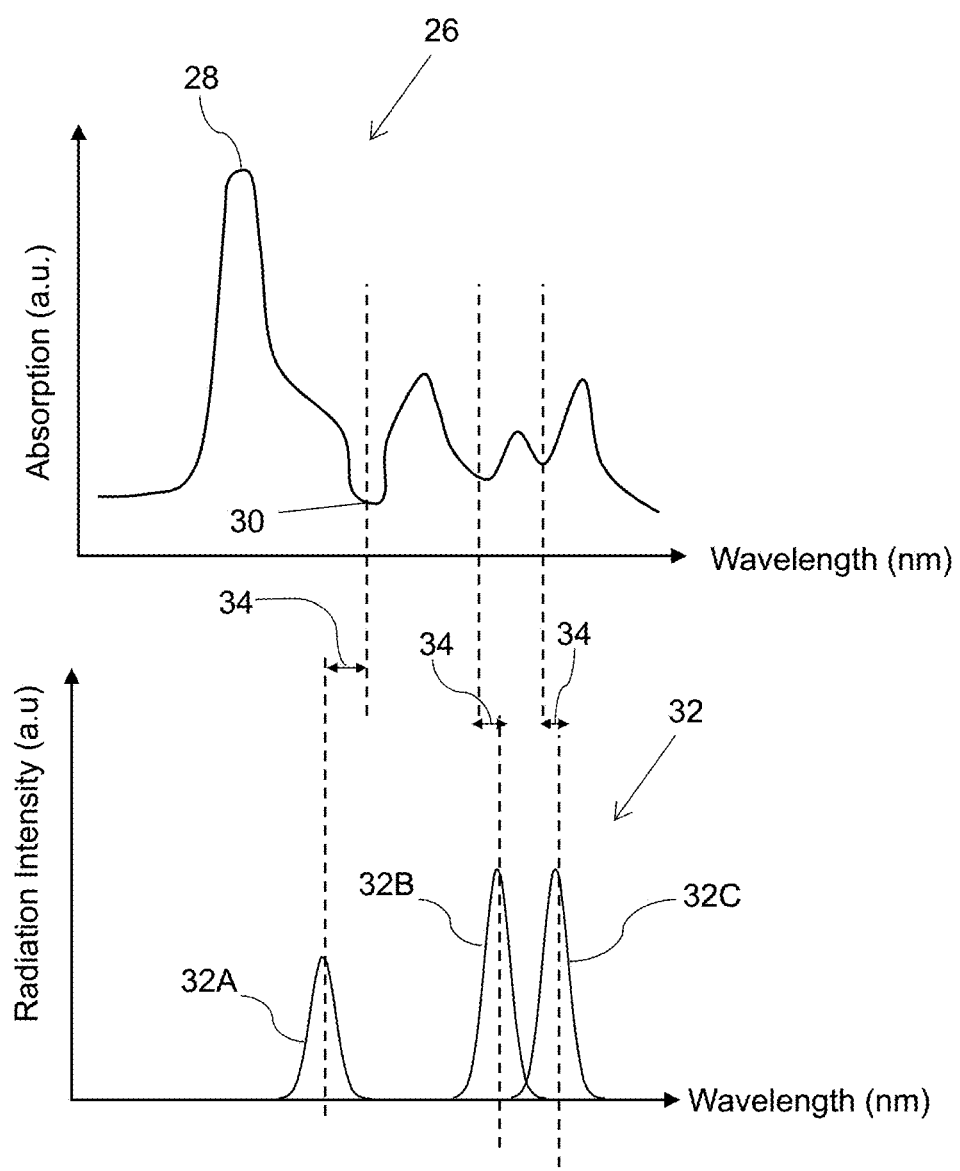
FIG. 2 shows a schematic of an absorption spectra of a target compound present in a fluid that can undergo ultraviolet irradiation with a system like the one depicted in FIG. 1, and a schematic of a set of peak wavelengths from a set of ultraviolet radiation sources that can irradiate the fluid such that the peak wavelengths are proximate in value to at least one wavelength corresponding to the absorption valleys in the absorption spectra of FIG. 2A according to an embodiment.

FIG. 2 illustrates an example of an absorption spectra of a target compound present in a fluid and a set of peak wavelengths that can be utilized by set of ultraviolet radiation sources for treatment of the fluid without resulting in any unwelcome alterations of the fluid. In particular, FIG. 2 shows an example of an absorption spectra 26 of a riboflavin which can be found in a number of beverages, including but not limited to, beer, energy drinks, orange juice, milk, and coffee. As noted above, with respect to beer, riboflavins can react with the bittering principles in beer such as isohumulones, and form 3-MBT, upon exposure to ultraviolet light, which leads to the beer having a skunky flavor. In the example depicted in FIG. 2, the absorption spectra 26 of the riboflavin can be characterized by several absorption peaks 28 and valleys 30. The absorption peaks 28 for the riboflavin represent regions at which the absorption of the ultraviolet light by the compound is the greatest within a range of adjacent wavelengths, while the absorption valleys 30 represent regions at which the absorption is the lowest within a range of adjacent wavelengths. Since the interaction of the riboflavin with ultraviolet radiation and other organic compounds in the beer is the precipitating factor in the beer having a skunky flavor, it is desirable to irradiate the riboflavin at a wavelength where absorption is at a minimum. Irradiating the riboflavin at wavelengths that are proximate to the absorption valleys 30 will not impart the skunky flavor to the beer because the beer does not significantly absorb the ultraviolet light at these wavelengths. However, the ultraviolet light can effectively irradiate and destroy the undesired germs/viruses/etc.

FIG. 2 also shows a set of peak wavelengths 32 (32A, 32B, 32C) of ultraviolet radiation that can be used by the ultraviolet radiation sources to irradiate the riboflavin that are proximate in value to at least one of the wavelengths corresponding to the absorption valleys 30 in the absorption spectra 26. As used herein, wavelengths that are proximate in value means wavelengths located within an allowed variation of each other, wherein the proximity between a given peak wavelength and any other wavelength is determined by the absolute value of the difference between a given peak wavelength and any other wavelength. FIG. 2 shows that the set of peak wavelengths 32 are sufficiently far from the absorption peaks 28 depicted in the spectra 26. Sufficiently far, as used herein, means located such that the full width at half maximum of the peak wavelength 32 does not overlap with a full width at half maximum of any absorption peak 28.

FIG. 2 also shows examples of allowed variations 34 between the set of peak wavelengths 32 (32A, 32B, 32C) and the absorption valleys 30 in the spectra 26. The allowed variations can include a full width at half maximum of the peak wavelengths 32. In one embodiment, the full width at half maximum of the peak wavelengths 32 can be selected not to exceed 20 nm. In this manner, the spectral distribution of the ultraviolet radiation generated from the ultraviolet radiation sources can have narrow peaks that avoid wavelength regions in the proximity of the absorption peaks 28. Having the set of peak wavelengths 32 within an allowed variation of the absorption valleys 30 that is sufficiently far from the absorption peaks 28 ensures that the radiation does not significantly affect the riboflavin.

Figure 3:
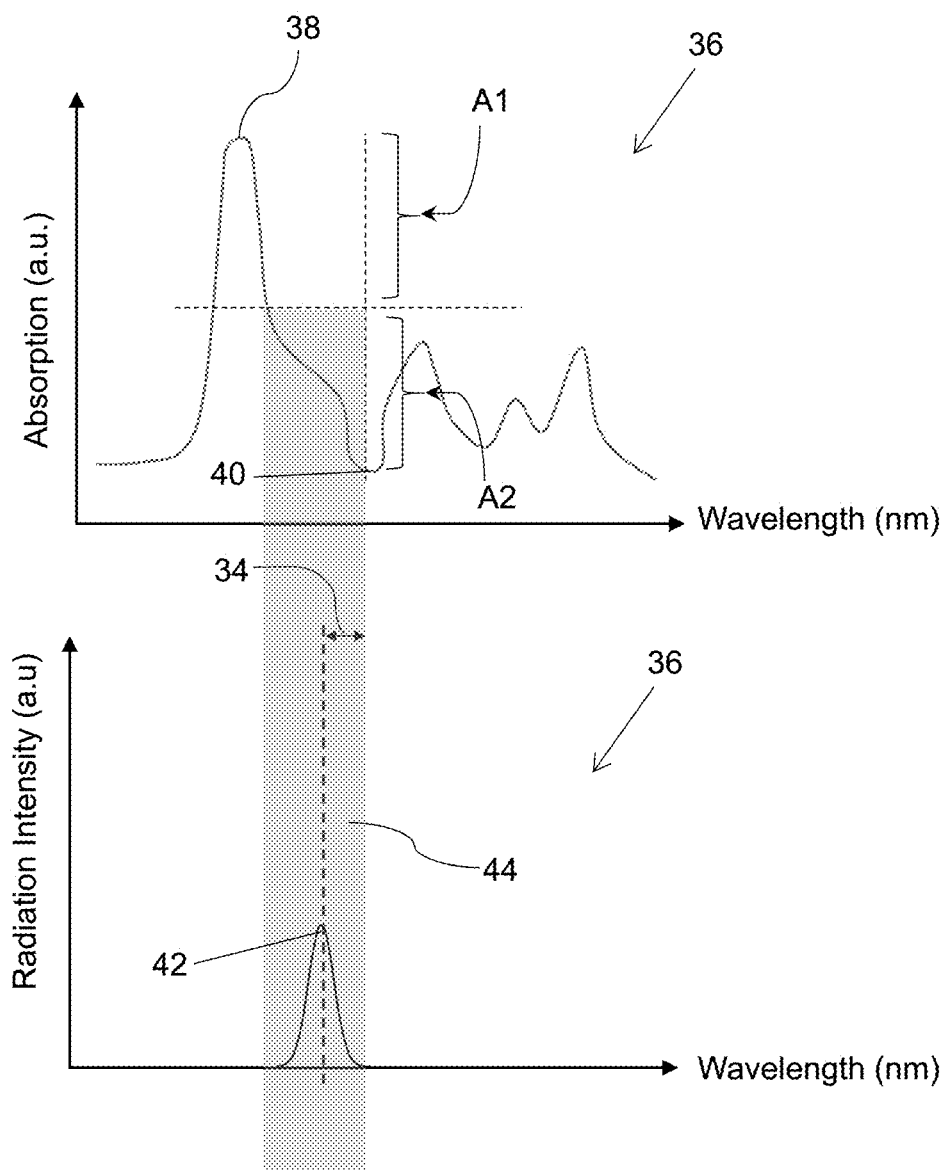
FIG. 3 shows another example of an absorption spectra of a target compound and a set of peak wavelengths that can be used in a system like the one depicted in FIG. 1 to irradiate a fluid with ultraviolet radiation according to an embodiment.

FIG. 3 shows another example illustrating how a set of peak wavelengths can be selected for use with ultraviolet radiation source(s) that irradiate a target compound, such as riboflavin, found in a fluid without imparting any undesirable effects to the fluid. In particular, FIG. 3 shows an absorption spectra 36 for the riboflavin having absorption peaks 38 and valleys 40, as well as an example of a peak wavelength 42 from a set of wavelengths of ultraviolet radiation that can be used to irradiate the riboflavin that is proximate in value to one of the wavelengths corresponding to an absorption valley 40 in the absorption spectra 36. Like the example illustrated in FIG. 2, the peak wavelength(s) for the ultraviolet radiation source(s) in FIG. 3 can be selected from a wavelength range around an absorption valley 40 of the absorption spectra 36.

In this embodiment, the peak wavelength 42 of the source can be selected from a wavelength range around an absorption valley, such that absorption at any wavelength in the wavelength range is at least less than half the difference between absorption of a neighboring highest peak and absorption at the absorption valley. In the example illustrated in FIG. 3, region 44 illustrates an acceptable range of wavelengths for the peak wavelength 42 that conform to this criteria with respect to the adjacent absorption peak 38 having a lower wavelength. More specifically, the A1 region can correspond to absorption that is half or greater than the difference between the absorption peak 38 and the absorption valley 40, while the A2 region can correspond to absorption that is at least less than half the difference between the absorption peak 38 and the absorption valley 40.

It is understood that the target compound described with respect to FIGS. 2 and 3, riboflavin, is only an example of one organic compound that can be used to calibrate the peak wavelengths of the ultraviolet radiation source(s) 22. Other organic compounds can be used to calibrate the peak wavelengths of the ultraviolet radiation source(s) 22. The types of organic compounds that can be used to calibrate the peak wavelengths will depend on the particular beverage and the compounds in the fluid that can react unfavorably to the exposure of ultraviolet light and can be selected using any solution.

Although not illustrated in FIG. 1, the system 10 for irradiating the fluid 12, as well as the systems of the other embodiments described herein can utilize other components that facilitate the optimized irradiation of the fluid 12 and the conduit 14 and/or containers used to store the fluid while ensuring no ill effects to the fluid. For example, the system 10 can include a control unit that is configured to direct the ultraviolet radiation source 22 to treat the fluid with ultraviolet radiation. In one embodiment, the control unit can adjust at least one of a plurality of irradiation parameters associated with the radiation generated from the set of ultraviolet radiation source 22. The plurality of irradiation parameters can comprise the wavelength of the ultraviolet radiation emitted by the set of ultraviolet radiation sources 22, an intensity or overall dosage of the ultraviolet radiation delivered to a volume of the fluid 12 by the set of ultraviolet radiation sources, and a treatment time that the ultraviolet radiation sources deliver the ultraviolet radiation to the fluid.

In one embodiment, the control unit can be used to turn on or off the ultraviolet radiation source 22 dependent upon the detected conditions provided by one or more sensors located in the system 10. To this extent, the control unit can operate in conjunction with a set of sensors that can be located about the fluid 12 and the conduit 14 to control the operation of the ultraviolet treatment on the fluid. For example, the set of sensors can generate signals representative of specific conditions or process parameters that each is configured to detect and send those signals to the control unit which uses the signals to adjust one or more of the irradiation parameters. One type of sensor that can be deployed can include a fluid transparency sensor that can detect the transparency of the fluid. Examples of a fluid transparency sensor can include, but are not limited to, an LED-photodetector pair that is in close contact with the fluid. A fluorescence sensor that can detect the fluorescence emissivity of the fluid after irradiation is another type of sensor that can be utilized. Examples of a fluorescence sensor can include, but are not limited to, a fluorometer. Another type of sensor that can be deployed in a fluid irradiation system according to one of the embodiments described herein can include a chemical sensor to detect chemical components of the fluid.

A bacterial fluorescence sensor is another type of sensor that can be deployed to detect the amount or presence of bacteria, germs, viruses, and/or the like, which is present in the fluid. In particular, the bacterial fluorescence sensor can generate signals representative of the condition of the fluid with respect to the amount of bacteria, germs, viruses, and the like, and send these signals to the control unit. In this manner, the control unit can determine whether an ultraviolet treatment is necessary as a function of the signals provided by the bacterial fluorescence sensor using any solution. Additionally, the control unit can determine the progress of the treatment depending on the presence of these signals.

In one embodiment, the control unit can activate the operation of the ultraviolet radiation source(s) 22 in response to determining that the presence of an amount of bacteria, germs, viruses, and/or the like, within the fluid, exceeds a predetermined threshold, and thus, necessitating an ultraviolet treatment. Activating the operation of the ultraviolet radiation sources 22 by the control unit can include specifying any of the aforementioned irradiation parameters. It is understood that other irradiation parameters can be specified and/or adjusted. Other irradiation parameters can include, but are not limited to, the angular distribution of the ultraviolet radiation transmitted from the ultraviolet radiation sources 22, a power setting for operating the ultraviolet radiation sources 22, and a maximum operating temperature for the ultraviolet treatment. It is understood that all of these irradiation parameters are illustrative of some of the parameters that can be set by the control unit and are not meant to be limiting as other parameters exist which may be specified.

It is also understood that the systems of the various embodiments are not meant to be limited to the aforementioned sensors. A multitude of different types of sensors can be used with any of the various embodiments of the present invention. Other sensors that are suitable for use with any of the various embodiments can include, but are not limited to, a temperature sensor, a pressure sensor, a humidity sensor, and a radiation sensor (e.g., an ultraviolet dose counter or meter). Each of these sensors could detect the level or amount of a particular process parameter that each is intended to measure and send signals thereof to the control unit. For example, a temperature sensor can detect the temperature of the fluid 12 and/or the temperature of the surface of the conduit 14. These sensors can be deployed along with the ultraviolet radiation sources 22 in any desired configuration. For example, the sensors can be interspersed in a housing with the ultraviolet radiation sources 22 or separated from each other.

A timer with switches and/or the like, which can be integrated with the control unit or as a separate component, can be used to manage the duration that the ultraviolet radiation sources 22 are on for a particular ultraviolet treatment and ensure that radiation is applied to the fluid for that duration. In one embodiment, the control unit operating in conjunction with the timer can manage the amount of time that the ultraviolet radiation sources 22 radiate in the UV-C range versus the UV-B range. The duration and frequency that the ultraviolet radiation sources 22 are utilized can depend on detected condition signals provided to the control unit by any of the sensors, as well as any other predetermined treatment factors.

In an embodiment, the control unit can include an input component and an output component that allows a user that is monitoring a beverage manufacturing process to interact with the fluid irradiation system 10. For example, the input component can permit the user to adjust at least one of the aforementioned irradiation parameters. This can include making adjustments during the ultraviolet irradiation treatment and/or prior to initiating a treatment. In one embodiment, the input component can include a set of buttons and/or a touch screen to enable the user to specify various input selections regarding the irradiation parameters. The output component can include a number of different output devices to present information to the user such as, for example, a vibration device, a visible light (e.g., flashing), an auditory signal generated by a speaker, and/or the like. For example, the output component can include a visual display for providing status information on the ultraviolet irradiation (e.g., time remaining, the presence of bacteria, viruses, germs, or the like), the condition of the fluid (e.g., odor and appearance changes), an indication that a ultraviolet irradiation treatment is recommended, an indication that the fluid has been sterilized, disinfected, sanitized, a simple visual indicator that displays whether a ultraviolet treatment is underway (e.g., an illuminated light) or if the treatment is over (e.g., absence of an illuminated light).

Both the control unit and the sensor(s) can include a wireless transmitter and receiver that is configured to facilitate communications with each other and a remote location via Wi-Fi, BLUETOOTH, and/or the like. As used herein, a remote location is a location that is apart from any of the fluid irradiation systems described herein. For example, a remote computer can be used to transmit operational instructions to the wireless transmitter and receiver. The operational instructions can be used to program functions performed and managed by the control unit and the sensors. In another embodiment, the wireless transmitter and receiver can transmit ultraviolet treatment results, data from and to the remote computer, to facilitate maintenance and diagnostic operations on the ultraviolet irradiation systems.

The fluid irradiation system 10 of FIG. 1 as well as the systems of the other embodiments described herein can further include a power source that is configured to power each of the ultraviolet radiation sources 22, the control unit and the sensors. In one embodiment, the power source can take the form of one or more batteries, a vibration power generator that can generate power based on magnetic inducted oscillations or stresses developed on a piezoelectric crystal. In another embodiment, the power source can include a super capacitor that is rechargeable. Other power components that are suitable for use as the power source for the fluid irradiation system 10 and the control unit and the sensors can include a mechanical energy to electrical energy converter such as a piezoelectric crystal, and a rechargeable device The fluid irradiation systems of the various embodiments can also include a heat dissipating component. A heat dissipating component enables the electronic componentry associated with the ultraviolet radiation sources 22, the control unit, the sensors and the power source to operate efficiently without overheating. Examples of a heat dissipating component can include, but are not limited to, a heat sink, an air fan, and/or other heat dissipating mechanisms, such as liquid heating.

Most of the aforementioned components of the fluid irradiations system are illustrated in FIGS. 4A-4B, 6A-6B, 7 and 8 and discussed further with regard to these figures. It is understood that the functions of these components can vary and will depend on the type of fluid and the organic compounds within the fluid that react adversely to ultraviolet light that are targeted or used to calibrate the peak wavelengths of the ultraviolet radiation sources 22. Thus, the functions described are only illustrative of examples of particular functions and operations to be performed and are not meant to be limiting to the beer and riboflavin embodiments described herein.

Figure 4A:
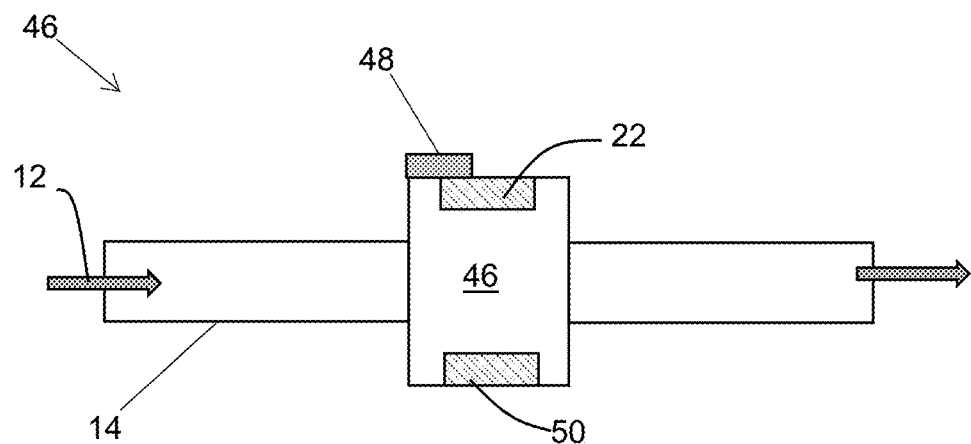
FIGS. 4A-4B show schematics of ultraviolet treatment chambers having at least one sensor and a control unit that can be used to irradiate a fluid transported by a fluid transport conduit according to embodiments.
Figure 4B:
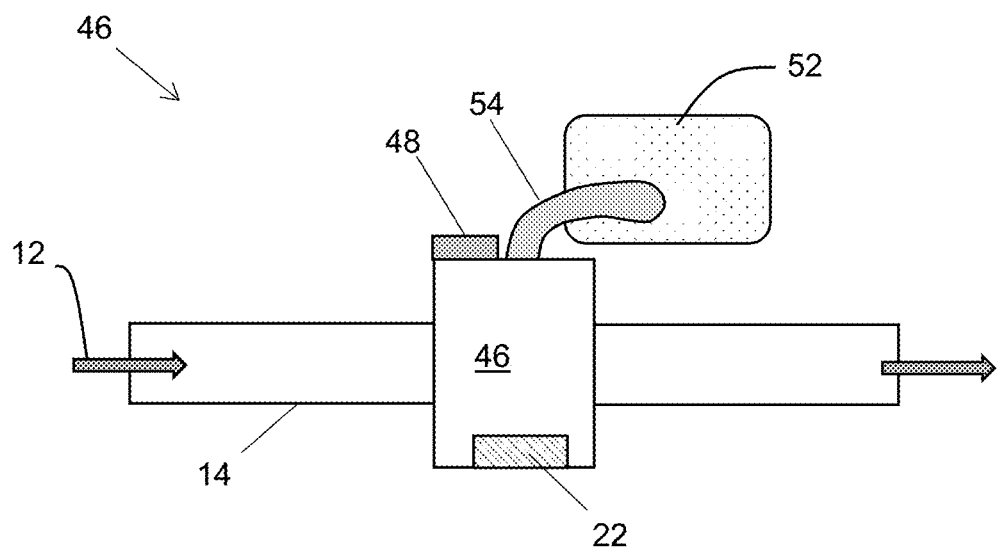

As noted above with respect to FIG. 1, the fluid irradiation system 10 including the conduit 14 and the ultraviolet radiation sources 22 can be implemented to operate as part of a housing or chamber configuration. FIGS. 4A-4B show schematics of an ultraviolet treatment chamber 46 having ultraviolet radiation sources 22, a control unit 48, and at least one sensor (50 and 52) that can be used to irradiate a fluid 12 transported by a fluid transport conduit 14 according to an embodiment. The ultraviolet treatment chamber 46 can include any type of enclosure, casing, covering, container, or the like, that can accommodate the conduit 14 for receiving and outputting the fluid 12 after irradiation by the ultraviolet radiation sources 22. In one embodiment, the ultraviolet treatment chamber 46 can include an interior section defining a hollow cavity that receives the conduit 14 and the fluid 12, surrounded by a set of inner walls, and an exterior section that encloses the interior.

All of the inner walls or at least a portion of the inner walls can include an ultraviolet reflective layer with a reflection coefficient of at least 50% in order to enable recycling of the ultraviolet radiation generated from the ultraviolet radiation sources 22 within the interior section. In one embodiment, the ultraviolet reflective layer can include a diffusive ultraviolet reflective layer comprising any of the aforementioned coatings or films of fluoropolymers. The exterior section of the ultraviolet treatment chamber 46 can be formed of an ultraviolet absorbing material that prevents the release of ultraviolet radiation from the chamber while preventing any radiation from penetrating through the chamber into the cavity including the fluid and conduit. Examples of ultraviolet absorbing material can include, but are not limited to, many types of glass and plastic, as well as most metals without a heavily polished surface.

As shown in FIG. 4A, the set of ultraviolet radiation sources 22 can be positioned above fluid 12 and the conduit 14 that carries the fluid into the interior section of ultraviolet treatment chamber 46 for irradiation. It is understood that the ultraviolet radiation sources 22 can occupy other positions within the chamber 46 and are not limited to locations above the fluid 12 and the conduit 14. For example, the ultraviolet radiation sources 22 can be positioned below the fluid 12 and the conduit 14 carrying the fluid as shown in FIG. 4B, at locations where the fluid is supplied into or released from the ultraviolet treatment chamber 46, or in various combinations of any these sites. In one embodiment, the ultraviolet radiation sources 22 can be located on the exterior of the ultraviolet treatment chamber 46. For example, an ultraviolet transparent window can be formed on the exterior of the ultraviolet treatment chamber 46 so that radiation generated from externally placed ultraviolet radiation sources can direct the radiation into the interior section of the chamber to irradiate the fluid 12 and conduit 14, while absorbing any radiation that recirculates within the interior section to prevent it from being released out from the chamber 46.

In the embodiment depicted in FIG. 4A, the sensor 50 can include any type of ultraviolet radiation sensor that is configured to detect the ultraviolet radiation, which can be correlated with the transparency of the fluid 12. In one embodiment, the sensor 50 can detect the intensity of the radiation in the fluid. The control unit 48 receives the intensity measurements from the fluid transparency sensor and can determine the transparency of the fluid 12 in the conduit 14. Based on the transparency of the fluid 12, the control unit 48 can adjust at least one of the plurality of irradiation parameters described herein, e.g., adjust intensity, duration, up or down to ensure that a predetermined dose is delivered to the fluid. To this extent, the ultraviolet radiation sources 22 can be calibrated to deliver an appropriate amount of ultraviolet radiation based on the transparency of the fluid, while simultaneously ensuring that any targeted compounds in the fluid that are known to have undesirable reactions to radiation, only receive certain wavelength levels that correspond with a minimized amount of absorption that does not lead to reactions with the radiation that can adversely affect the fluid.

In another embodiment, the sensor 50 can include a fluorescence sensor, such as a fluorometer, that is configured to detect the fluorescence emissivity of the fluid 12 after irradiation by the ultraviolet radiation sources 22. In one embodiment, the fluorescence sensor can detect the fluorescence emissivity of the radiation in the fluid. The control unit 48 receives the fluorescence measurements from the fluorescence sensor and can use these measurements to determine the fluorescence emissivity of the fluid 12 in the conduit 14.

In general, the wavelength and intensity of the fluorescence emissivity of the fluid 12 can provide an indication of presence and/or level of a particular chemical, bacteria, and/or the like. Based on the wavelength and intensity of the fluorescence emissivity, the control unit 48 can evaluate the transparency of the fluid 12 and adjust at least one of the plurality of irradiation parameters described herein using any solution. To this extent, the ultraviolet radiation sources 22 can be calibrated to deliver an appropriate amount of ultraviolet radiation based on the transparency of the fluid. As mentioned above, this includes delivering ultraviolet radiation that treats (e.g., disinfects, sterilizes, and/or the like) the fluid, while simultaneously ensuring that any targeted compounds in the fluid that are known to have undesirable reactions to radiation, only receive certain wavelength levels that correspond with a minimized amount of absorption by these compounds, precluding a reaction that can adversely affect the fluid.

In the embodiment illustrated in FIG. 4B, the sensor 52 that operates in conjunction with the ultraviolet treatment chamber 46, the control unit 48 and the ultraviolet radiation sources 22, can include a chemical sensor configured to detect chemical components of the fluid 12. The chemical sensor can comprise any suitable sensor, which can be selected based on the corresponding chemical components desired to be detected. In operation, the chemical sensor can obtain measurements of the chemical components of the fluid 12 from evaluating a portion of the fluid that is diverted to the chemical sensor via a flow path 54. The control unit 48 can use these measurements to determine the chemical composition of the fluid.

In this manner, the control unit 48 can be configured to determine an amount or concentration of a target compound in the fluid based on chemical composition of the fluid. This can include the presence of desired and undesired chemicals. For example, the control unit 48 can determine the amount of ethanol or sugars in the fluid 12. This allows the control unit 48 to adjust at least one of the irradiation parameters associated with the ultraviolet radiation sources 22 as a function of the determined chemical composition. To this extent, the ultraviolet radiation sources 22 can be calibrated to deliver an appropriate amount of ultraviolet radiation based on the chemical composition of the fluid. In one scenario, the control unit 48 could adjust the amount of ultraviolet radiation based on an amount of ethanol and/or sugars in the fluid.

It is understood that the embodiments depicted in FIGS. 4A-4B are only illustrative of a couple of possible implementations of an ultraviolet treatment chamber with ultraviolet radiation sources, at least one sensor and a control unit that can be used for irradiating a fluid carried by a fluid conduit and are not meant to be limiting. Those skilled in the art will appreciate that a multitude of different treatment chamber configurations can be implemented to irradiate a fluid for treatment purposes (e.g., disinfection, sterilization) while minimizing the amount of radiation that is absorbed by certain targeted compounds in the fluid, precluding any unpleasant alterations to the fluid by the irradiation.

In one embodiment, the ultraviolet treatment chambers can be implemented with more than one set of ultraviolet radiation sources. For example, an ultraviolet treatment chamber can be configured to have at least two sets of ultraviolet radiation sources that are configured to irradiate the fluid. In scenario, a first set of ultraviolet radiation sources can irradiate the fluid at a first set one of peak wavelengths ranging from 230 nm to 360 nm with a peak full width at half maximum that is less than 20 nm, wherein the first set of peak wavelengths are proximate in value to at least one wavelength in the wavelengths corresponding to the absorption valleys in the absorption spectra of the fluid. A second set of ultraviolet radiation sources can irradiate the fluid at a second set of peak wavelengths in the range of 230 nm to 360 nm with a peak full width at half maximum being less than 20 nm, with the peak wavelength of the second set coinciding to within a full width half maximum wavelength value to the absorption peaks of the fluid's absorption spectra.

The use of at least two sets of ultraviolet radiation sources operating in conjunction with one or more of the aforementioned sensors can be useful in evaluating the concentration of targeted organic compound(s) in the fluid as a function of the absorption of the radiation within the fluid. With this information, the control unit associated with the ultraviolet treatment chamber can ensure that the sets of ultraviolet radiation sources deliver an appropriate amount of ultraviolet radiation that treats (e.g., disinfects, sterilizes, and the like) the fluid, while simultaneously ensuring that the targeted compounds only receive certain wavelength levels that correspond with a minimized amount of absorption.

In one embodiment, at least two sets of radiation sources can be used to affect certain chemical reactions with targeted organic compounds in the fluid. For example, each set of radiation sources can emit radiation having a different peak wavelength. In one example, the sets of ultraviolet radiation sources can emit radiation with peak wavelengths corresponding to two or more absorption valleys for a compound, or absorption valleys for two or more different compounds. Furthermore, one set of radiation sources can be used to monitor the fluid (e.g., evaluate a presence of a compound or contaminant using a low level of ultraviolet radiation), while another set of radiation sources can be used to treat the fluid. In one embodiment, a first set of ultraviolet radiation sources can operate at a set of peak wavelengths that range from 230 nm to 360 nm, and a second set of ultraviolet radiation sources can operate at a set of peak wavelengths that range from 250 nm to 290 nm.

In one embodiment, two or more sets of ultraviolet radiation sources can be utilized to facilitate a disinfection treatment of the fluid in the conduit. For example, in one scenario, a first set of ultraviolet radiation sources and a second set of ultraviolet radiation sources can be used to irradiate the fluid. The first set of ultraviolet radiation sources can include UV-A radiation sources configured to irradiate the fluid with UV-A radiation in a range of 380 nm to 460 nm. The second set of ultraviolet radiation sources can be configured to operate at a set of peak wavelengths ranging from 230 nm to 360 nm with a peak full width at half maximum that is less than 20 nm. In one embodiment, each of the set of peak wavelengths of the second set of ultraviolet radiation sources can be proximate in value to at least one wavelength in the second set of wavelengths corresponding to the absorption valleys in the absorption spectra of the fluid with an allowed variation.

At least one sensor can be used to detect a process parameter associated with the fluid during the irradiation of the fluid by the first set of ultraviolet radiation sources and the second set of ultraviolet radiation sources. The control unit can be configured to control the irradiation of the fluid by the first set of ultraviolet radiation sources and the second set of ultraviolet radiation sources in response to the process parameter detected by the at least one sensor. In one embodiment, the control unit can direct the first set of ultraviolet radiation sources to irradiate the fluid with the UV-A radiation for a prolonged time period that ranges from tens of minutes to tens of hours and the second set of ultraviolet radiation sources to irradiate the fluid with the ultraviolet radiation at short burst of intensity lasting at most a few minutes.

In operation, the first and second set of ultraviolet radiation sources can be used to determine if the fluid is in need of an ultraviolet irradiation treatment, apply the ultraviolet irradiation treatment upon determining that such a treatment is necessary, and perform a more aggressive ultraviolet irradiation treatment if it is determined that there is a rapid growth of microbial activity while performing the ultraviolet irradiation treatment. For example, in one embodiment, the control unit can direct the first set of ultraviolet radiation sources to perform an initial irradiation treatment for ascertaining whether the fluid contains an amount of contamination that exceeds a first predetermined contamination threshold that is indicative of a need for a more extensive ultraviolet irradiation treatment. In this embodiment, a fluorescence sensor can be used to detect the fluorescence emitted from the fluid after irradiation by the first set of ultraviolet radiation sources, wherein the fluorescence sensor is configured to send signals representative of the detected fluorescence to the control unit. The control unit can then evaluate the amplitude of the signals to determine the amount of contamination present in the fluid and compare the determined amount of contamination to the first predetermined contamination threshold. The control unit can direct the first set of ultraviolet radiation sources to continue irradiating the fluid with a more extensive ultraviolet irradiation treatment if the first predetermined contamination threshold is exceeded.

The control unit and the fluorescence sensor are configured to monitor the amount of contamination present in the fluid while the first set of ultraviolet radiation sources perform the more extensive ultraviolet irradiation treatment. In one embodiment, the control unit can compare the determined amount of contamination to a second predetermined contamination threshold that is indicative of a need for more intense ultraviolet irradiation treatment due to rapid growth of microbial activity. It is understood that the first and second predetermined contamination thresholds can be derived from values known to be indicative of certain levels of contamination, observational values, or values specified by those skilled in the art of art with knowledge of the particular fluid and the effect that certain values have on the fluid from a health and quality perspective. The control unit can direct the second set of ultraviolet radiation sources to perform the more intense ultraviolet irradiation treatment at the short burst of intensity that lasts at most a few minutes if the amount of contamination exceeds the second predetermined contamination threshold.

Figure 5A:
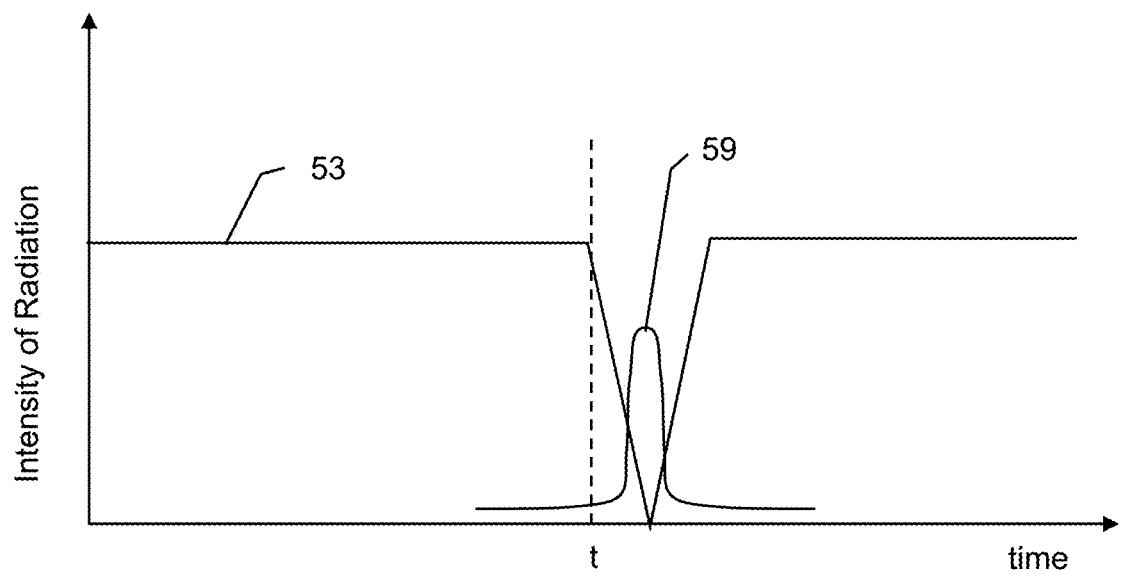
FIGS. 5A-5B show graphical examples depicting the operation of a scenario in which a first set of ultraviolet radiation sources and a second set of ultraviolet radiation sources are used to apply an ultraviolet irradiation treatment after determining that such a treatment is necessary, and perform a more aggressive ultraviolet irradiation treatment if it is determined during the current treatment that there is a rapid growth of microbial activity according to an embodiment.
Figure 5B:
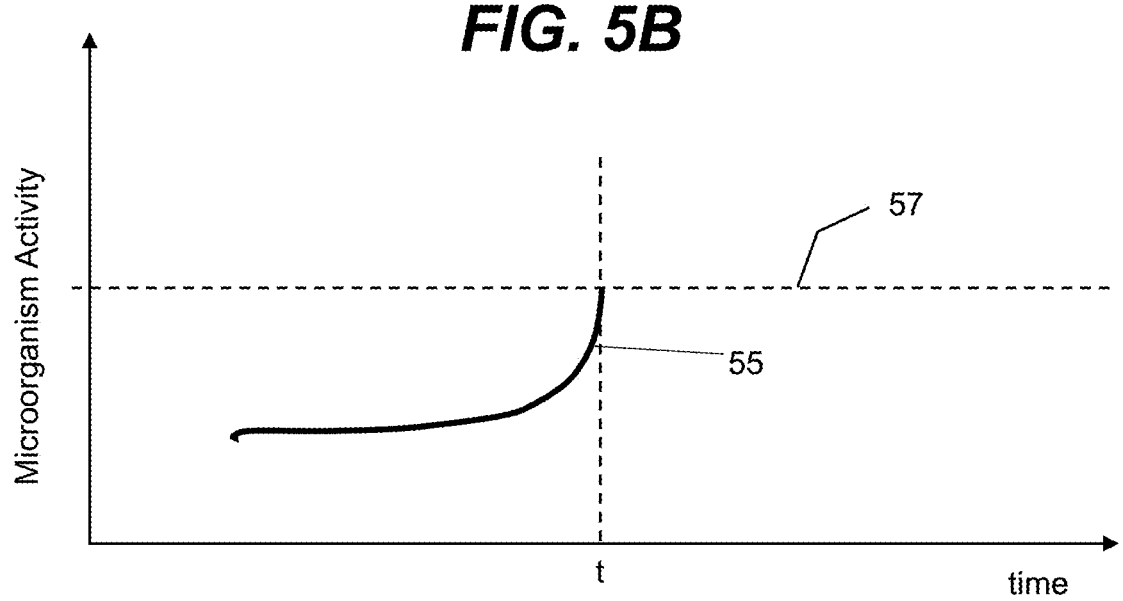

FIGS. 5A-5B show examples of graphical representations that depict the operation of a scenario in which a first set of ultraviolet radiation sources and a second set of ultraviolet radiation sources are used to apply an ultraviolet irradiation treatment after determining that such a treatment is necessary, and perform a more aggressive ultraviolet irradiation treatment if it is determined that there is a rapid growth of microbial activity while performing the ultraviolet irradiation treatment. As shown in FIG. 5A at section 53 of the graph, ultraviolet radiation from the first set of the radiation sources is used to perform a more extensive ultraviolet irradiation treatment of the fluid over the prolonged time period that can range from tens of minutes to tens of hours. During this time, the control unit and the fluorescence sensor operate in conjunction to monitor the amount of contamination present in the fluid while the first set of ultraviolet radiation sources perform the more extensive ultraviolet irradiation treatment.

In this example, FIG. 5B shows a sharp increase in the growth of microorganism activity as noted by reference element 55. When the level of microorganism activity approaches the second predetermined contamination threshold 57 at time t that is indicative of a need for more intense ultraviolet irradiation treatment due to rapid growth of microbial activity, then the control unit will direct the second set of ultraviolet radiation sources to perform the more intense ultraviolet irradiation treatment at the short burst of intensity that lasts at most a few minutes (FIG. 5A, reference number 59) starting at or shortly after time t. In this manner, ultraviolet radiation (e.g., UV-C radiation) applied from the second set of ultraviolet radiation sources can bring microbial activity within appropriate limits by rapidly suppressing microbial activity in the fluid as opposed to the near UV (e.g., 300 nm to 400 nm) radiation generated from the first set of ultraviolet radiation sources.

In this embodiment, a third set of ultraviolet radiation sources also can be used to irradiate the fluid. For example, the third set of ultraviolet radiation sources can include one or more UV-B radiation sources configured to irradiate the fluid with UV-B radiation in a range of 340 nm to 400 nm. To this extent, the UV-B radiation generated from the third set of ultraviolet radiation sources can be used to complement the radiation generated from the first and second sets of radiation sources. In one embodiment, the UV-B radiation generated from the third set of ultraviolet radiation sources can be used with any of the above-noted photocatalysts to form hydroxyl group radicals and ROS. It is understood, that the peak wavelengths of the ultraviolet radiation of the various types of sources can be chosen from ranges that have been determined to not have any adverse effects on target compounds within the fluid that can affect the taste, appearance, and smell of the fluid. For example, in a scenario where the fluid is beer, the peak wavelengths of the ultraviolet radiation sources can be selected to not have an adverse effect on riboflavin and other important chemical compounds found in beer that can lead to the skunky flavor if certain wavelengths of ultraviolet radiation are absorbed by the beer.

In one embodiment, a set of ultraviolet radiation sources can be configured to operate specifically for irradiating the fluid conduit, container, and/or the like, while devoid of fluid. For example, this set of ultraviolet radiation sources can be configured to operate at a disinfection wavelength and intensity that is designed to disinfect the conduit. In one scenario, this set of ultraviolet radiation sources used for disinfection purposes can operate at a wavelength that ranges between 250 nm to 290 nm.

In one embodiment, a set of visible light sources configured to irradiate the fluid with visible light radiation can operate in conjunction with the set of ultraviolet radiation sources. Irradiating the fluid with visible light radiation can be useful in that one or more attributes of the fluid can be determined without exposing the fluid to unnecessary ultraviolet radiation. Examples of visible light sources that can be used include, but are not limited to, visible light emitting diodes. In one embodiment, a set of blue and visible light emitting diodes can be used with the ultraviolet radiation sources to detect contaminant(s), e.g., by inducing fluorescence, determining transparency, and/or the like.

It is understood that any implementation of the various sets of ultraviolet radiation sources with or without the visible light sources and the sensor(s) is not meant to be limited to one specific configuration as a multiple of arrangements of these components is possible. This multiple of arrangements can include varying positional locations of these components within the treatment chamber with respect to the fluid and the conduit. Similarly, the number of each of the components that are utilized in an arrangement is variable. Further, the components can be configured to function in a coordinated manner or an uncoordinated manner. For example, some of the ultraviolet radiation sources 22 can operate at the same wavelengths and intensities for the same duration, or the sources can operate at different wavelengths and intensity for varying durations. In one embodiment, a first set of ultraviolet radiation sources 22 can operate at a target wavelength and intensity that is designed for the disinfection of one type of bacteria and/or viruses, a second set of ultraviolet radiation sources can operate at a different target wavelength and intensity that is designed for disinfection of a different type of bacteria and/or viruses, while a third set of ultraviolet radiation sources can operate at a different target wavelength designed to effect a chemical reaction with certain organic compounds present in the fluid 12.

The various embodiments described are also not meant to be limited to use with only conduits that carry the fluids. In one embodiment, a conveyor system (e.g., a conveyor belt) that moves various types and sizes of containers (e.g. bottles, cans, jugs, and the like) is suitable for use with any of the fluid irradiation systems described herein. In this manner, the fluid irradiation systems of the various embodiments can be used to treat (e.g., disinfect, sterilize, sanitize, and/or the like) the fluid and the containers while ensuring that targeted compounds within the fluid only receive certain wavelength levels that correspond with a minimized amount of absorption, thereby obviating any unpleasant alterations to the fluid. The use of a conveyor system can also be used with the fluid irradiation systems to affect certain chemical reactions with targeted organic compounds in the fluid stored in the containers.

The above described ultraviolet treatment chambers as well any of the other fluid irradiation systems described herein can be used with a number of different components that facilitate treatment of a beverage manufacturing process that processes a fluid into a beverage. For example, a filtering system can be used to filter a fluid before entering an ultraviolet treatment chamber for irradiation. In one embodiment, the filtering system can include a filtering element that removes undesired contaminants from the fluid prior to entering or leaving an ultraviolet treatment chamber. Examples of a filtering material that is suitable for use as a filtering element can include, but are not limited to, AAO, porous silicon oxide, carbon and various phases of carbon, and/or the like.

In one embodiment, a pre-treatment component can be configured to treat the fluid prior to receiving an irradiation treatment by an ultraviolet treatment chamber. The pre-treatment component can include a filtering element that removes undesired contaminants from the fluid. The pre-treatment component can include an ultraviolet transparent enclosure having an inlet port and an outlet port for transporting the fluid there through into the ultraviolet treatment chamber. The ultraviolet transparent enclosure can be enclosed within an ultraviolet impenetrable housing. The pre-treatment component can further include at least one pre-treatment ultraviolet radiation source located about the ultraviolet transparent enclosure to pre-treat the fluid with ultraviolet radiation. A set of sensors (e.g., temperature sensors, pressure sensors, turbidity sensors, etc.) can be arranged along with the pre-treatment ultraviolet radiation sources. The pre-treatment ultraviolet radiation sensors and the sensors can operate in conjunction with a control unit to effectuate a pre-ultraviolet treatment of the fluid passing through the ultraviolet transparent enclosure using well-known methodologies.

In one embodiment, a mixing component can be utilized to mix the fluid during irradiation by a set of ultraviolet radiation sources. Mixing the fluid during irradiation may be beneficial in that it can allow for the use of fewer LEDs to penetrate into the fluid while still providing irradiation in close contact with the LEDs. In another instance, mixing a fluid may be part of a particular stage in a beverage manufacturing process and the set of ultraviolet radiation sources can direct radiation to the fluid as it is mixed for purposes that can include but are not limited to, disinfection, alteration of targeted compound in the fluid (e.g., inactivate yeast build-up). Examples of mixing component can include, but are not limited to, stirrers with paddles, fluid circulation pumps, etc.

Figure 6A:
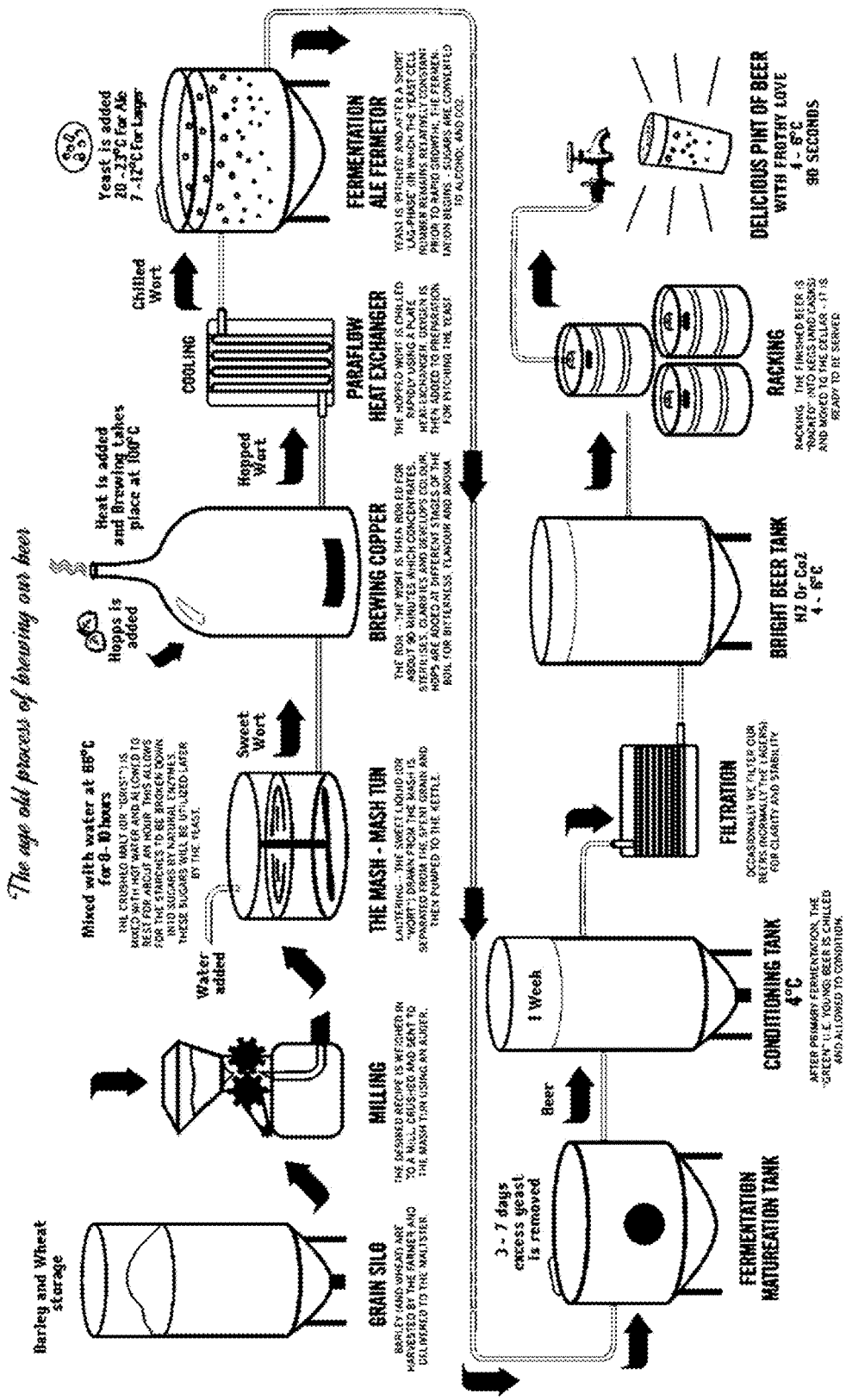
Figure 6B:
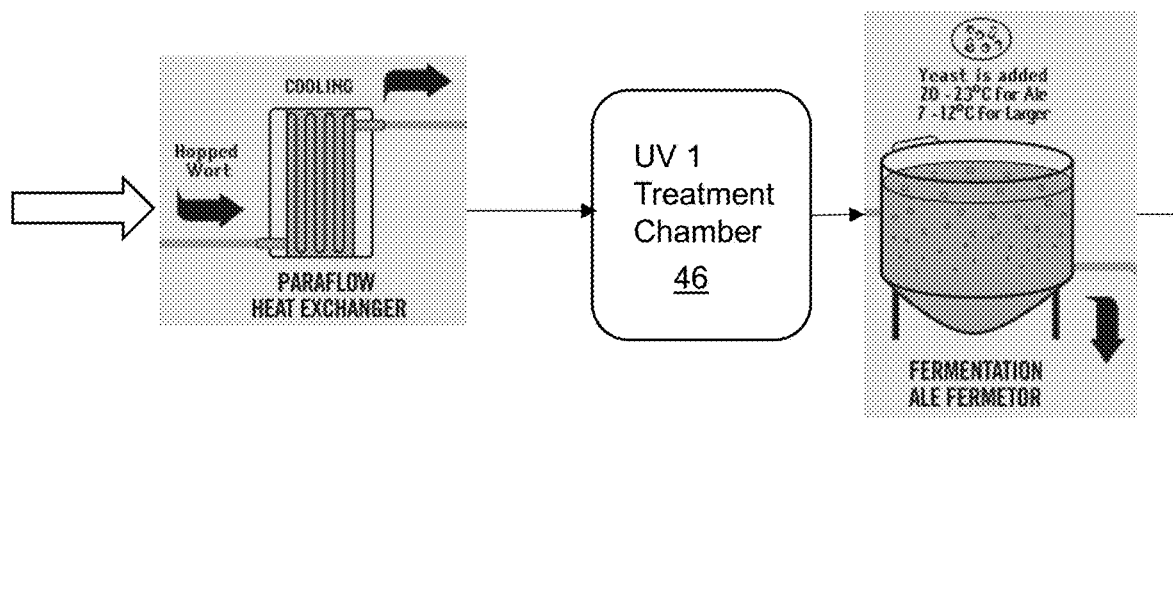
FIG. 6B shows a portion of the beer brewing process depicted in FIG. 6A with one or more ultraviolet treatment chambers to irradiate the beer producing fluid with ultraviolet radiation according to an embodiment.
Figure 6B:
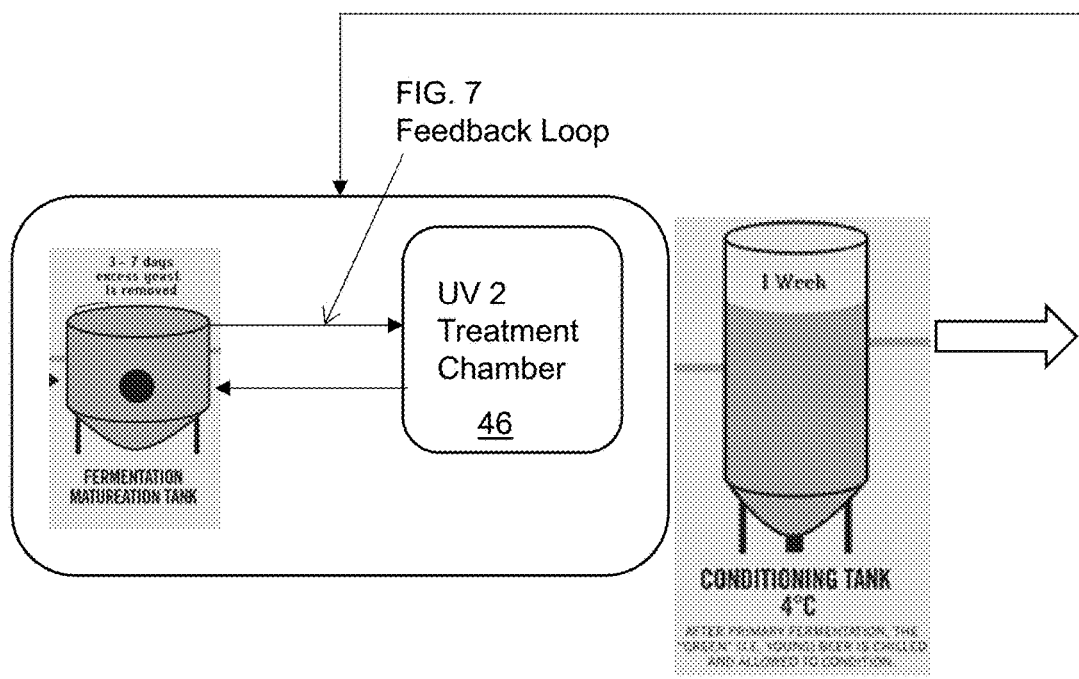

It is understood that all of the aforementioned components as well as the ultraviolet treatment chambers including the sources, sensors and control units can be used in various stages of the beverage manufacturing process and are not meant to be limited to one particular location or processing stage within a beverage manufacturing process. One example of an embodiment in which these components are well suited for use include a beer brewing process. FIG. 6A shows a schematic of an illustrative beer brewing process 56 according to the prior art, while FIG. 6B shows a portion of the beer brewing process depicted in FIG. 6A with one or more ultraviolet treatment chambers 46 to irradiate the beer producing fluid with ultraviolet radiation according to an embodiment.

In the beer brewing process 56 of FIG. 6A, barley and wheat are harvested and transferred for storage in a grain silo. The barley and the wheat form the base malt that provides the majority of sugars for fermentation. A specified amount of barley and wheat is applied to a mill for milling. The milled barley and wheat is then sent to a mash tun having an auger. During the mash, the crush malt from the milling is mixed with hot water and allowed to rest for about an hour. This allows for the starches to be broken down into sugars by natural enzymes. These sugars can be used later by the yeast that is added for fermentation. A sweet liquid known as wort is drawn out from the mash in a lautering process and separated from the spent grain. This sweet wort is then pumped into a brewing kettle where hops are added and heated at temperatures of about 100° Celsius for brewing. In particular, the wort is boiled for about 90 minutes so that the wort concentrates, sterilizes, clarifies, and develops color. Hops are added at different stages of the boil for bitterness, flavor and aroma.

The hopped wort is then added to a heat exchanger for cooling. In particular, the hopped wort is chilled rapidly using a heat exchanger. Oxygen can then be added to the chilled wort for pitching the yeast. As shown in FIG. 6A, the yeast is added to the chilled wort in a fermentation ale fermenter. The temperature that the yeast is pitched into the fermenter will depend on the type of beer that is being brewed. For example, the yeast can be pitched at 20° Celsius to 23° Celsius for an ale, while the yeast can be pitched at 7° Celsius to 12° Celsius for a lager. Nevertheless, after a short lag phase in which the yeast cell number remains relatively constant it then undergoes a rapid growth. It is during this rapid growth that the fermentation begins, resulting in the sugars being converted to alcohol and carbon dioxide.

After fermentation is complete, the beer undergoes a rest period in a fermentation maturation tank. This begins the lagering or aging phase where the beer is held in the maturation tank to mature, allowing the flavors to mellow and residual yeast to settle. The beer can then be applied to a conditioning or carbonating tank that has a temperature of about 4° Celsius. Conditioning the beer at this temperature causes the yeast to go dormant and begin to settle at the bottom of the conditioning tank. A filtration system can filter the beer applied from the conditioning tank to a beer tank having a temperature that can range from about 4° Celsius to about 6° Celsius. In addition, nitrogen or carbon dioxide can be added to the beer tank, which prepares the beer for packaging into kegs, bottles, and cans for eventual consumption. The beer brewing process 56 of FIG. 6A represents one particular process for brewing beer and does not limit the applicability of the various embodiments to all of the different beer brewing processes.

Embodiments of the present invention can be used to control the quality of the beer during the brewing process. In such a capacity, the ultraviolet radiation generated from the ultraviolet radiation sources can be selected to operate within a set of wavelengths that partly neutralize the bacteria and yeast, and control the alcohol content within the wort of the beer. Between the wort cooling step at the heat exchanger and the addition of yeast in the fermentation ale fermenter is one area in the beer brewing process 56 of FIG. 6A where the bacteria count builds up very rapidly to sometimes unacceptable levels. FIG. 6B discloses an example of one embodiment in which a fluid irradiation system of the type described herein can be used to destroy or remove the bacteria at a wavelength that safely and effectively treats (e.g., disinfects, sterilizes) the chilled wort, while ensuring that the selected wavelength does not adversely affect the taste of resulting beer.

In the embodiment depicted in FIG. 6B, one ultraviolet (UV1) treatment chamber 46 can be added in the beer brewing process 56 of FIG. 6A after the heat exchanger, while another ultraviolet (UV2) treatment chamber 46 can be added as part of the fermentation maturation tank downstream of the fermentation ale fermenter. To this extent, the UV1 and UV2 treatment chambers 46, which can include ultraviolet radiation sources and visible light sources, sensors, and a control unit per any one of the previously described embodiments, can neutralize bacteria, inactivate yeast that is added to the brewing process during the fermentation stage and control alcohol content of the beer that is formed. In particular, the UV1 treatment chamber 46 can be used to initially irradiate the chilled wort provided from the heat exchanger to neutralize any bacteria that may be present in the wort. The UV2 treatment chamber 46 can be used with the fermentation maturation tank in a feedback control loop to monitor the presence of yeast, alcohol and bacteria within the wort that eventually yields the beer after lagering and conditioning. To this extent, the UV2 treatment chamber 46 can be used to control the amount of yeast, alcohol and bacteria that is present in the beer.

Figure 7:
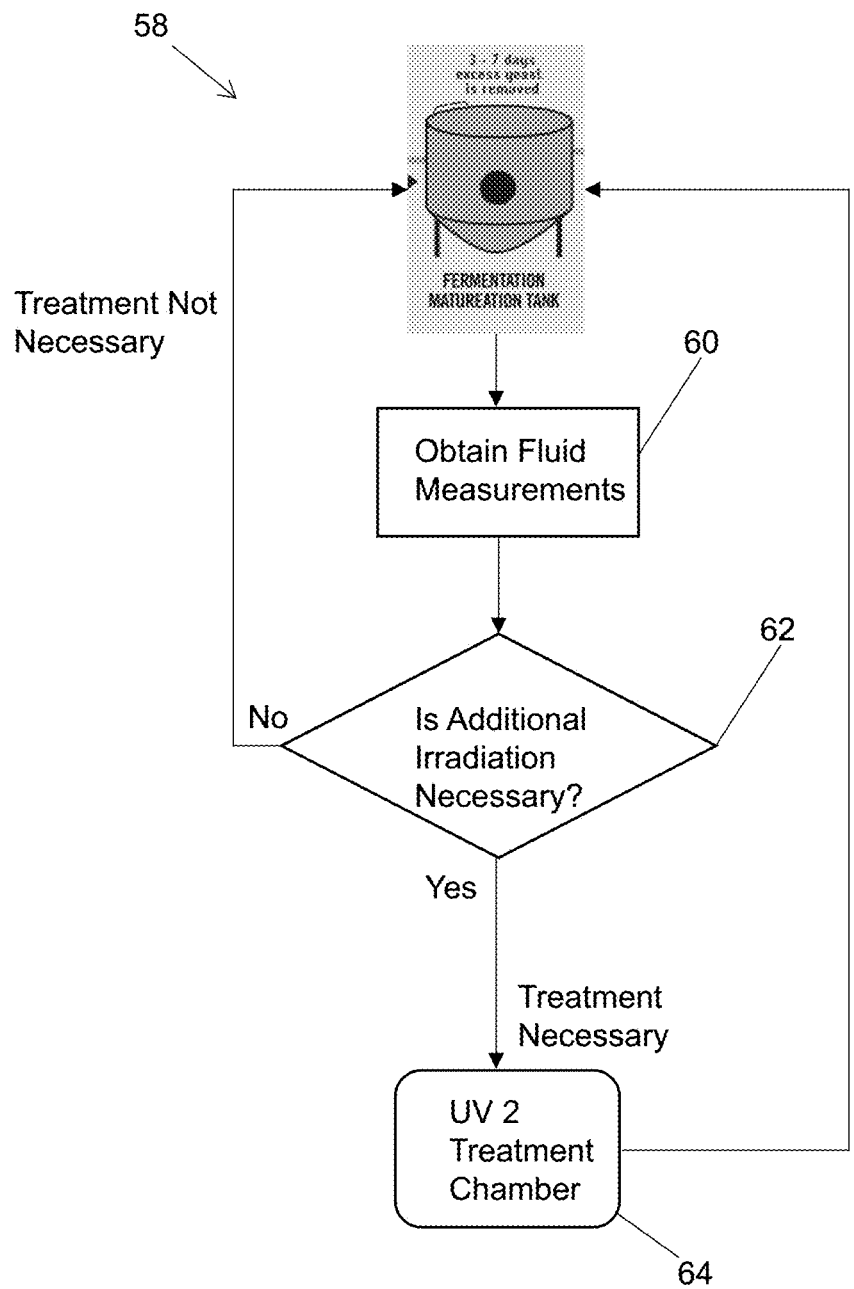
FIG. 7 shows a schematic of a more detailed view of an ultraviolet irradiation feedback control loop depicted in FIG. 6B that operates in conjunction with one of the ultraviolet treatment chambers according to an embodiment.

FIG. 7 shows a schematic of a more detailed view of the ultraviolet irradiation feedback loop 58 depicted in FIG. 6B. In particular, the feedback loop illustrates some of the actions that can occur at the fermentation maturation tank with the UV2 treatment chamber. The feedback loop 58 of FIG. 7 begins with the sensor(s) that are associated with the UV2 treatment chamber obtaining fluid measurements of the beer in the fermentation maturation tank at 60. As noted above, measurements can include, but are not limited, to fluid transparency, fluorescence emissivity, chemical components detected in the fluid, and bacteria present in the fluid. The control unit can use these measurements to make a number of determinations with respect to the beer, including, but not limited to, the condition of the beer, the chemical and bacterial composition of the beer (e.g., the amount of ethanol, yeast and bacteria), and the like that are used to determine whether additional irradiation is necessary at 62. For example, the control unit can determine the amount of ethanol and sugars present in the beer. If there is too much ethanol and/or sugars in the beer, then the control unit can direct the UV2 treatment chamber at 64 to irradiate the beer for further treatment that controls the amount of alcohol in the beer and/or inactivates or neutralizes the yeast content in the beer. If the control unit determines that further treatment is not necessary, then the beer brewing process can continue with the conditioning, filtering and packaging of the beer after fermentation in the maturation tank is complete.

If further ultraviolet treatment of the beer is necessary as determined at 62, then the control unit adjusts one or more of any of the irradiation parameters of the ultraviolet radiation sources used in the UV2 treatment chamber. It is understood that the particular irradiation parameters that are adjusted will depend on the detected measurements and the criteria (e.g., fluid transparency, fluorescence emissivity, bacterial and chemical composition) used for the calibration of the sources.

In one embodiment, the feedback control loop 58 can be implemented for a set period of time. In one embodiment, the measurements and evaluation of the measurements can correspond with the amount of time specified for the lagering or aging stage in the fermentation maturation tank.

It is understood that the feedback control loop depicted in FIG. 6B and described in FIG. 7 can be implemented in other stages of the beer brewing process, in addition to, or in place of the sites noted in FIG. 6B. Also, it is understood that instead of having each ultraviolet treatment chamber implemented with a control unit, a centralized control unit that maintains control over all of the stages of the beer brewing process can be utilized. Further, it is understood that skilled artisans would be able to implement similar feedback control loops that are tailored specifically for use in the production of other beverages where it may be desirable to irradiate a fluid, but is not typically practical because of the potential for the radiation to alter the taste, smell and appearance of the fluid.

Figure 8:
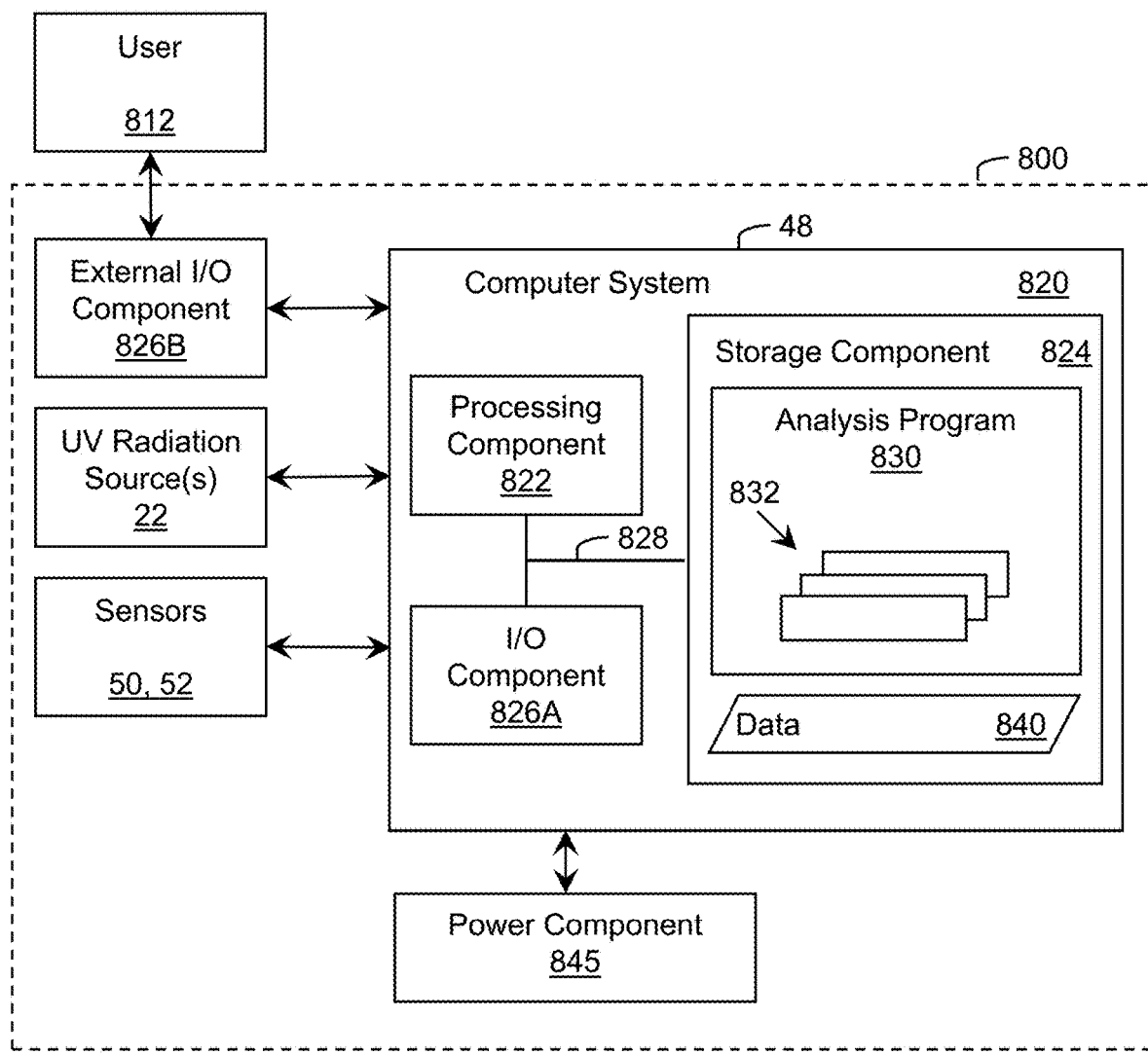
FIG. 8 shows a schematic block diagram representative of an overall processing architecture of an ultraviolet treatment system for irradiating a fluid that is applicable to any of the systems describe herein according to an embodiment.

FIG. 8 shows a schematic block diagram representative of an overall processing architecture of an ultraviolet treatment system 800 for irradiating a fluid that is applicable to any of the systems describe herein according to an embodiment. In this embodiment, the architecture 800 is shown including the ultraviolet radiation sources 22 (UV radiation source(s)) and the sensors 50, 52 for the purposes of illustrating the interaction of all of the components that are used to provide an ultraviolet treatment of a fluid in a beverage manufacturing process.

As depicted in FIG. 8 and described herein, the ultraviolet treatment system 800 can include a control unit 48. In one embodiment, the control unit 48 can be implemented as a computer system 820 including an analysis program 830, which makes the computer system 820 operable to manage the ultraviolet radiation sources 22, visible light sources and the sensors 50, 52 in the manner described herein. In particular, the analysis program 830 can enable the computer system 820 to operate the ultraviolet radiation sources 22 to generate and direct ultraviolet radiation towards a volume of fluid and process data corresponding to one or more attributes regarding the fluid, which can be acquired by the sensors 50, 52. The computer system 820 can individually control each ultraviolet radiation source 22 and sensor 50, 52 and/or control two or more of the ultraviolet radiation sources and the sensors as a group. Furthermore, the ultraviolet radiation sources 22 can emit ultraviolet radiation of substantially the same wavelength or of multiple distinct wavelengths, or at any other noted sets of peak wavelengths.

In an embodiment, during an initial period of operation, the computer system 820 can acquire data from at least one of the sensors 50, 52 regarding one or more attributes of the fluid and generate data 840 for further processing. The data 840 can include information regarding a presence of biological activity (e.g., microorganisms, viruses, bacteria, and/or the like) in the fluid, an amount of radiation (e.g., ultraviolet, infrared, visible, and/or microwave) detected, and/or the like. The computer system 820 can use the data 840 to control one or more aspects of the ultraviolet radiation generated by the ultraviolet radiation source(s) 22 during an ultraviolet treatment of the fluid.

Furthermore, one or more aspects of the operation of the ultraviolet radiation sources 22 can be controlled or adjusted by a user 812 via an external interface I/O component 826B. The external interface I/O component 826B can be located, for example, on the exterior of any of the aforementioned ultraviolet treatment chambers and used to allow the user 812 to selectively turn on/off the ultraviolet radiation sources 22.

The external interface I/O component 826B can include, for example, a touch screen that can selectively display user interface controls, such as control dials, which can enable the user 812 to adjust one or more of: an intensity, scheduling, and/or other operational properties of the set of ultraviolet radiation sources 22 (e.g., operating parameters, radiation characteristics). In an embodiment, the external interface I/O component 826B could conceivably include a keyboard, a plurality of buttons, a joystick-like control mechanism, and/or the like, which can enable the user 812 to control one or more aspects of the operation of the set of ultraviolet radiation sources 22. The external interface I/O component 826B also can include any combination of various output devices (e.g., an LED, a visual display), which can be operated by the computer system 820 to provide status information pertaining to a treatment of a volume of fluid for use by the user 812. For example, the external interface I/O component 826B can include one or more LEDs for emitting a visual light for the user 812, e.g., to indicate a status of the ultraviolet treatment of the fluid. In an embodiment, the external interface I/O component 826B can include a speaker for providing an alarm (e.g., an auditory signal), e.g., for signaling that ultraviolet radiation is being generated or that an ultraviolet treatment has finished.

The computer system 820 is shown including a processing component 822 (e.g., one or more processors), a storage component 824 (e.g., a storage hierarchy), an input/output (I/O) component 826A (e.g., one or more I/O interfaces and/or devices), and a communications pathway 828. In general, the processing component 822 executes program code, such as the analysis program 830, which is at least partially fixed in the storage component 824. While executing program code, the processing component 822 can process data, which can result in reading and/or writing transformed data from/to the storage component 824 and/or the I/O component 826A for further processing. The pathway 828 provides a communications link between each of the components in the computer system 820. The I/O component 826A and/or the external interface I/O component 826B can comprise one or more human I/O devices, which enable a human user 812 to interact with the computer system 820 and/or one or more communications devices to enable a system user 812 to communicate with the computer system 820 using any type of communications link. To this extent, during execution by the computer system 820, the analysis program 830 can manage a set of interfaces (e.g., graphical user interface(s), application program interface, and/or the like) that enable human and/or system users 812 to interact with the analysis program 830. Furthermore, the analysis program 830 can manage (e.g., store, retrieve, create, manipulate, organize, present, etc.) the data, such as data 840, using any solution.

In any event, the computer system 820 can comprise one or more general purpose computing articles of manufacture (e.g., computing devices) capable of executing program code, such as the analysis program 830, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the analysis program 830 can be embodied as any combination of system software and/or application software.

Furthermore, the analysis program 830 can be implemented using a set of modules 832. In this case, a module 832 can enable the computer system 820 to perform a set of tasks used by the analysis program 830, and can be separately developed and/or implemented apart from other portions of the analysis program 830. When the computer system 820 comprises multiple computing devices, each computing device can have only a portion of the analysis program 830 fixed thereon (e.g., one or more modules 832). However, it is understood that the computer system 820 and the analysis program 830 are only representative of various possible equivalent monitoring and/or control systems that may perform a process described herein with regard to the control unit, the ultraviolet radiation sources and the sensors. To this extent, in other embodiments, the functionality provided by the computer system 820 and the analysis program 830 can be at least partially be implemented by one or more computing devices that include any combination of general and/or specific purpose hardware with or without program code. In each embodiment, the hardware and program code, if included, can be created using standard engineering and programming techniques, respectively. In another embodiment, the control unit can be implemented without any computing device, e.g., using a closed loop circuit implementing a feedback control loop in which the outputs of one or more sensors are used as inputs to control the operation of a treatment. Illustrative aspects of the invention are further described in conjunction with the computer system 820. However, it is understood that the functionality described in conjunction therewith can be implemented by any type of monitoring and/or control system.

When the computer system 820 comprises multiple computing devices, each computing device can have only a portion of the analysis program 830 fixed thereon (e.g., one or more modules 832). However, it is understood that the computer system 820 and the analysis program 830 are only representative of various possible equivalent computer systems that may perform a process described herein. To this extent, in other embodiments, the functionality provided by the computer system 820 and the analysis program 830 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 820 includes multiple computing devices, the computing devices can communicate over any type of communications link. Furthermore, while performing a process described herein, the computer system 820 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

All of the components depicted in FIG. 8 can receive power from a power component 845. The power component 845 can take the form of one or more batteries, a vibration power generator that can generate power based on magnetic inducted oscillations or stresses developed on a piezoelectric crystal, a wall plug for accessing electrical power supplied from a grid, and/or the like. In an embodiment, the power source can include a super capacitor that is rechargeable. Other power components that are suitable for use as the power component can include solar, a mechanical energy to electrical energy converter such as a piezoelectric crystal, a rechargeable device, etc.

While shown and described herein as a system and method, it is understood that aspects of the present invention further provide various alternative embodiments. For example, in one embodiment, the various embodiments of the present invention can include a computer program fixed in at least one computer-readable medium, which when executed, enables a computer system to facilitate the ultraviolet irradiation of fluids. To this extent, the computer-readable medium includes program code, such as the analysis program 830, which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the present invention can provide a method of providing a copy of program code, such as the analysis program 830, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the present invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the various embodiments of the present invention can implement a method that facilitates the ultraviolet irradiation of fluids. This can include configuring a computer system, such as the computer system 820, to implement a method for facilitating the ultraviolet irradiation of fluids. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system, comprising:
a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; and
a set of ultraviolet radiation sources to irradiate the fluid, the set of ultraviolet radiation sources configured to operate at a set of peak wavelengths ranging from 230 nm to 360 nm with a peak full width at half maximum that is less than 20 nm, wherein each of the set of peak wavelengths is proximate in value to at least one wavelength in the second set of wavelengths corresponding to the absorption valleys in the absorption spectra with an allowed variation of a full width half maximum of the absorption valley, such that the fluid is effectively treated with ultraviolet radiation while the target compound does not absorb a sufficient amount of ultraviolet radiation to adversely affect the fluid.

2. The system of claim 1, wherein the set of peak wavelengths generated from the set of ultraviolet radiation sources each have a width that precludes wavelength regions in proximity to the first set of wavelengths corresponding to the absorption peaks in the absorption spectra.

3. The system of claim 2, wherein the set of peak wavelengths generated from the set of ultraviolet radiation sources coincide within a full width at half maximum value of a wavelength associated with one of the absorption valleys in the absorption spectra.

4. The system 1, wherein each of the set of peak wavelengths correlates with at least one wavelength in the second set of wavelengths corresponding to the absorption valleys in the absorption spectra, wherein absorption at any wavelength in the second set of wavelengths is at least less than half the difference between an absorption value of a neighboring highest absorption peak and an absorption value at its corresponding absorption valley.

5. A system, comprising:
a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra; and
an ultraviolet treatment chamber to treat the fluid with ultraviolet radiation, the ultraviolet treatment chamber including a set of ultraviolet radiation sources to irradiate the fluid, the set of ultraviolet radiation sources configured to operate at a set of peak wavelengths ranging from 230 nm to 360 nm with a peak full width at half maximum that is less than 20 nm, wherein the set of peak wavelengths are proximate in value to at least one wavelength in the second set of wavelengths corresponding to the absorption valleys in the absorption spectra with an allowed variation of a full width half maximum of the absorption valley, at least one sensor to detect a process condition associated with the fluid, such that the fluid is effectively treated with ultraviolet radiation while the target compound does not absorb a sufficient amount of ultraviolet radiation to adversely affect the fluid; and
a control unit operatively coupled to the set of ultraviolet radiation sources and the at least one sensor, wherein the control unit is configured to adjust at least one of a plurality of irradiation parameters associated with the radiation generated from the set of ultraviolet radiation sources as a function of the process condition detected by the at least one sensor, the plurality of irradiation parameters comprising the wavelength of the ultraviolet radiation emitted by the set of ultraviolet radiation sources, an intensity or overall dosage of the ultraviolet radiation delivered to a volume of the fluid in the ultraviolet treatment chamber by the set of ultraviolet radiation sources, and a treatment time that the ultraviolet radiation sources deliver the ultraviolet radiation to the fluid.

6. The system of claim 5, further comprising a conduit to transport the fluid into, through, and out from the ultraviolet treatment chamber.

7. The system of claim 6, wherein the conduit comprises an ultraviolet transparent conduit, wherein the ultraviolet transparent conduit comprises a predetermined height that allows passage of ultraviolet radiation while the fluid is transported through the ultraviolet treatment chamber.

8. The system of claim 5, wherein the set of peak wavelengths generated from the set of ultraviolet radiation sources each has a width that precludes wavelength regions in proximity to the first set of wavelengths corresponding to the absorption peaks in the absorption spectra.

9. The system of claim 5, wherein the target compound is a photosensitizers that alters an attribute of the fluid when exposed to the sufficient amount of ultraviolet radiation.

10. The system of claim 9, wherein the set of ultraviolet radiation sources include a sub-set of sources that operate at wavelengths ranging from 250 nm to 290 nm, and wherein each of the set of peak wavelengths correlates with at least one wavelength in the second set of wavelengths corresponding to the absorption valleys in the absorption spectra, wherein absorption at any wavelength in the second set of wavelengths is at least less than half the difference between an absorption value of a neighboring highest absorption peak and an absorption value at its corresponding absorption valley.

11. A system, comprising:
a fluid having a target compound with an absorption spectra having an ultraviolet wavelength ranging from 230 nm to 360 nm, the absorption spectra including a first set of wavelengths corresponding to absorption peaks in the absorption spectra and a second set of wavelengths corresponding to absorption valleys in the absorption spectra;
an ultraviolet transparent conduit to transport the fluid about a beverage manufacturing process having multiple fluid processing stages for formation of the beverage; and
at least one ultraviolet treatment chamber located about a fluid processing stage within the beverage manufacturing process to treat the fluid, the at least one ultraviolet treatment chamber including a set of ultraviolet radiation sources configured to irradiate the fluid, the set of ultraviolet radiation sources operating at a set of peak wavelengths ranging from 230 nm to 360 nm with a peak full width at half maximum that is less than 20 nm, wherein the set of peak wavelengths are proximate in value to at least one wavelength in the second set of wavelengths corresponding to the absorption valleys in the absorption spectra with an allowed variation of a full width half maximum of the absorption valley, such that the fluid is effectively treated with ultraviolet radiation while the target compound does not absorb a sufficient amount of ultraviolet radiation to adversely affect the fluid, at least one sensor to detect a process condition associated with the fluid, and a control unit operatively coupled to the set of ultraviolet radiation sources and the at least one sensor, wherein the control unit is configured to adjust at least one of a plurality of irradiation parameters associated with the radiation generated from the set of ultraviolet radiation sources as a function of the process condition detected by the at least one sensor.

12. The system of claim 11, wherein the at least one sensor comprises a fluid transparency sensor configured to detect the transparency of the fluid, wherein the control unit is configured to adjust at least one of the plurality of irradiation parameters generated by the set of ultraviolet radiation sources as a function of the transparency of the fluid.

13. The system of claim 11, wherein the at least one sensor comprises a fluorescence sensor configured to detect the fluorescence emissivity of the fluid after irradiation by the set of ultraviolet radiation sources, wherein the control unit is configured to adjust at least one of the plurality of irradiation parameters generated by the set of ultraviolet radiation sources as a function of the wavelength and the intensity of the fluorescence of the fluid.

14. The system of claim 13, wherein the control unit is configured to determine at least one of: a chemical or a bacterial, composition of the fluid based on the detected fluorescence emissivity.

15. The system of claim 11, wherein the at least one sensor comprises a chemical sensor configured to detect chemical components of the fluid, wherein the control unit is configured to determine the chemical composition of the fluid from the detected chemical components and adjust at least one of the plurality of irradiation parameters generated by the set of ultraviolet radiation sources as a function of the chemical composition of the fluid.

16. The system of claim 15, wherein the control unit is configured to determine an amount of the target compound in the fluid based on the chemical composition of the fluid.

17. The system of claim 15, wherein the control unit is configured to evaluate at least one of: an amount of ethanol within the fluid or an amount of sugars in the fluid.

18. The system of claim 11, wherein the at least one ultraviolet treatment chamber further comprises a set of visible light sources configured to irradiate the fluid with visible light radiation.

19. The system of claim 11, wherein the at least one ultraviolet treatment chamber comprises a first ultraviolet treatment chamber at a first fluid processing stage within the beverage manufacturing process and a second ultraviolet treatment chamber at a second fluid processing stage, the first ultraviolet treatment chamber and the second ultraviolet treatment chamber each having a set of ultraviolet radiation sources, at least one sensor, and a control unit operatively coupled to the set of ultraviolet radiation sources and the at least one sensor.

20. The system of 19, wherein the beverage manufacturing process comprises a beer brewing process, wherein the first ultraviolet treatment chamber is located upstream of a fermentation stage of the beer brewing process and the second ultraviolet treatment chamber is implemented as part of a fermentation maturation stage to neutralize bacteria, inactivate yeast that has been added to the brewing process during the fermentation stage and control alcohol content of the beer that is formed.

* * * * *